United States Patent [19]
Officer et al.

[11] Patent Number: 5,778,329
[45] Date of Patent: Jul. 7, 1998

[54] POWERSHIFT TRANSMISSION SYSTEM WITH TORQUE-MAPPED SHIFTS

[75] Inventors: Todd M. Officer, Fargo, N. Dak.; Scott A. Clausen, Coldwater, Ohio; Adrian G. Kallis, Fargo, N. Dak.

[73] Assignees: AGCO Corporation, Duluth, Ga.; Phoenix International Corporation, Fargo, N. Dak.

[21] Appl. No.: 458,965

[22] Filed: Jun. 2, 1995

Related U.S. Application Data

[63] Continuation-in-part of Ser. No. 176,021, Dec. 30, 1993, Pat. No. 5,454,767.

[51] Int. Cl.$^6$ .................................................. G06F 7/70
[52] U.S. Cl. ............................ 701/55; 701/51; 701/56; 701/67; 477/33; 477/151; 477/32; 477/156; 123/564; 60/602
[58] Field of Search ............... 364/424.1, 431.07, 364/424.08; 477/32, 156, 161, 109, 102, 34, 120–129, 155, 166, 181, 98, 151–152, 33, 900–904, 130–133; 434/71; 192/3.55, 3.62, 3.63, 48.5, 85 A, 87.11; 60/602, 600, 611, 603, 608, 609, 606, 599; 123/559.3, 421, 564, 399, 502, 486, 559.1; 73/116, 117.3; 475/70, 130, 133

[56] References Cited

U.S. PATENT DOCUMENTS

| | | | |
|---|---|---|---|
| 3,699,994 | 10/1972 | Mohri | 477/143 |
| 3,941,015 | 3/1976 | Robinson | 477/30 |
| 4,126,059 | 11/1978 | Smemo | 475/70 |
| 4,263,826 | 4/1981 | Hartz et al. | 477/30 |
| 4,425,620 | 1/1984 | Batchellor et al. | 364/424.1 |
| 4,458,471 | 7/1984 | Herwig | 460/6 |
| 4,715,184 | 12/1987 | Oasawa et al. | 60/602 |
| 4,855,913 | 8/1989 | Brekkestran et al. | 364/424.1 |
| 4,858,496 | 8/1989 | Iwatsuki et al. | 477/33 |
| 4,928,557 | 5/1990 | Takada et al. | 477/151 |
| 5,031,406 | 7/1991 | Akiyama | 60/602 |
| 5,073,865 | 12/1991 | Togai | 364/431.051 |
| 5,079,913 | 1/1992 | Kishishita | 60/597 |
| 5,083,434 | 1/1992 | Dahlgren et al. | 60/902 |
| 5,123,246 | 6/1992 | Younessi et al. | 60/602 |
| 5,261,236 | 11/1993 | Ironside et al. | 60/600 |
| 5,269,144 | 12/1993 | Miller et al. | 60/609 |
| 5,307,632 | 5/1994 | Gottemoller et al. | 60/608 |
| 5,355,677 | 10/1994 | Hawkins et al. | 60/609 |
| 5,388,476 | 2/1995 | Harger et al. | 74/473 R |
| 5,454,767 | 10/1995 | Clausen et al. | 477/32 |
| 5,477,840 | 12/1995 | Neuman | 123/564 |
| 5,526,261 | 6/1996 | Kallis et al. | 364/431.04 |

OTHER PUBLICATIONS

SAE Technical Paper Series 850169, Maynard, A., "A New Electronically Controlled Injection Pump for Diesels", 1985.

*Primary Examiner*—Jacques H. Louis-Jacques
*Attorney, Agent, or Firm*—Harness, Dickey & Pierce, P.L.C.

[57] ABSTRACT

A method for shifting a powershift transmission of a vehicle in accordance with the load being experienced by the engine as estimated from certain engine operating parameters. A turbocharger associated with an engine operating at a given engine speed generates a turbo boost pressure. The turbo boost pressure is monitored by a sensor and a turbo boost signal is generated therefrom. Similarly, the engine speed is monitored by a sensor and an engine speed signal is generated therefrom. The turbo boost and engine speed signals are used to estimate the engine load based on empirical data stored in the transmission controller's memory, and a percentage load is computed therefrom. The percentage load is then used to generate an appropriate duty cycle and time value for a pulse-width-modulated shift signal which controls the modulation of an on-coming directional clutch into engagement at a desired rate of engagement dependent upon the load being experienced by the vehicle.

29 Claims, 19 Drawing Sheets

FIG - 10

TURBO BOOST CONDITIONING TABLE

| Address | Index | | | Value | Description |
|---|---|---|---|---|---|
| 0000 & 019F | 54 BOOST_CONDITION_TBL: | | | | |
| 0000 & 019F | 55 | DW | 415 | 1.6230 | ;MULTIPLIER FOR BOOST AT 0 RPM |
| 0002 & 019F | 56 | DW | 415 | 1.6230 | ;MULTIPLIER FOR BOOST AT 100 RPM |
| 0004 & 019F | 57 | DW | 415 | 1.6230 | ;MULTIPLIER FOR BOOST AT 200 RPM |
| 0006 & 019F | 58 | DW | 415 | 1.6230 | ;MULTIPLIER FOR BOOST AT 300 RPM |
| 0008 & 019F | 59 | DW | 415 | 1.6230 | ;MULTIPLIER FOR BOOST AT 400 RPM |
| 000A & 019F | 60 | DW | 415 | 1.6230 | ;MULTIPLIER FOR BOOST AT 500 RPM |
| 000C & 019F | 61 | DW | 415 | 1.6230 | ;MULTIPLIER FOR BOOST AT 600 RPM |
| 000E & 019F | 62 | DW | 415 | 1.6230 | ;MULTIPLIER FOR BOOST AT 700 RPM |
| 0010 & 019F | 63 | DW | 415 | 1.6230 | ;MULTIPLIER FOR BOOST AT 800 RPM |
| 0012 & 019F | 64 | DW | 415 | 1.6230 | ;MULTIPLIER FOR BOOST AT 900 RPM |
| 0014 & 0183 | 65 | DW | 387 | 1.5100 | ;MULTIPLIER FOR BOOST AT 1000 RPM |
| 0016 & 0163 | 66 | DW | 355 | 1.3860 | ;MULTIPLIER FOR BOOST AT 1100 RPM |
| 0018 & 0150 | 67 | DW | 336 | 1.3120 | ;MULTIPLIER FOR BOOST AT 1200 RPM |
| 001A & 013F | 68 | DW | 319 | 1.2450 | ;MULTIPLIER FOR BOOST AT 1300 RPM |
| 001C & 0132 | 69 | DW | 306 | 1.1960 | ;MULTIPLIER FOR BOOST AT 1400 RPM |
| 001E & 0125 | 70 | DW | 293 | 1.1450 | ;MULTIPLIER FOR BOOST AT 1500 RPM |
| 0020 & 0117 | 71 | DW | 279 | 1.0910 | ;MULTIPLIER FOR BOOST AT 1600 RPM |
| 0022 & 010E | 72 | DW | 270 | 1.0550 | ;MULTIPLIER FOR BOOST AT 1700 RPM |
| 0024 & 010B | 73 | DW | 267 | 1.0410 | ;MULTIPLIER FOR BOOST AT 1800 RPM |
| 0026 & 010B | 74 | DW | 267 | 1.0420 | ;MULTIPLIER FOR BOOST AT 1900 RPM |
| 0028 & 0104 | 75 | DW | 260 | 1.0150 | ;MULTIPLIER FOR BOOST AT 2000 RPM |
| 002A & 0100 | 76 | DW | 256 | 1.0000 | ;MULTIPLIER FOR BOOST AT 2100 RPM |
| 002C & 0100 | 77 | DW | 256 | 1.0000 | ;MULTIPLIER FOR BOOST AT 2200 RPM |
| 002E & 0100 | 78 | DW | 256 | 1.0000 | ;MULTIPLIER FOR BOOST AT 2300 RPM |
| 0030 & 0100 | 79 | DW | 256 | 1.0000 | ;MULTIPLIER FOR BOOST AT 2400 RPM |
| 0032 & 0100 | 80 | DW | 256 | 1.0000 | ;MULTIPLIER FOR BOOST AT 2500 RPM |
| 0034 & 0100 | 81 | DW | 256 | 1.0000 | ;MULTIPLIER FOR BOOST AT 2600 RPM |

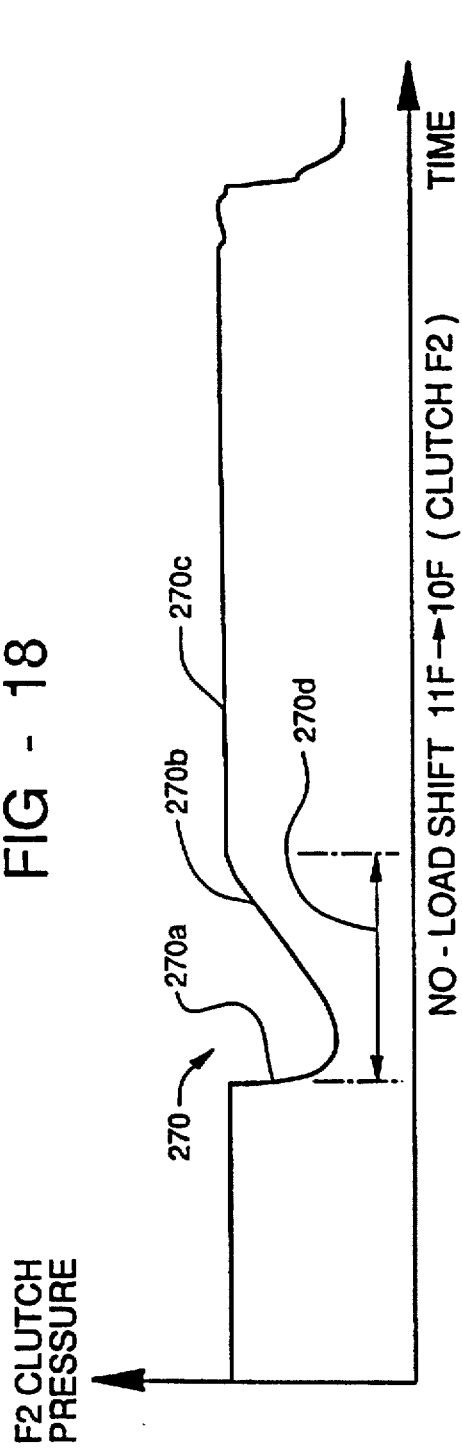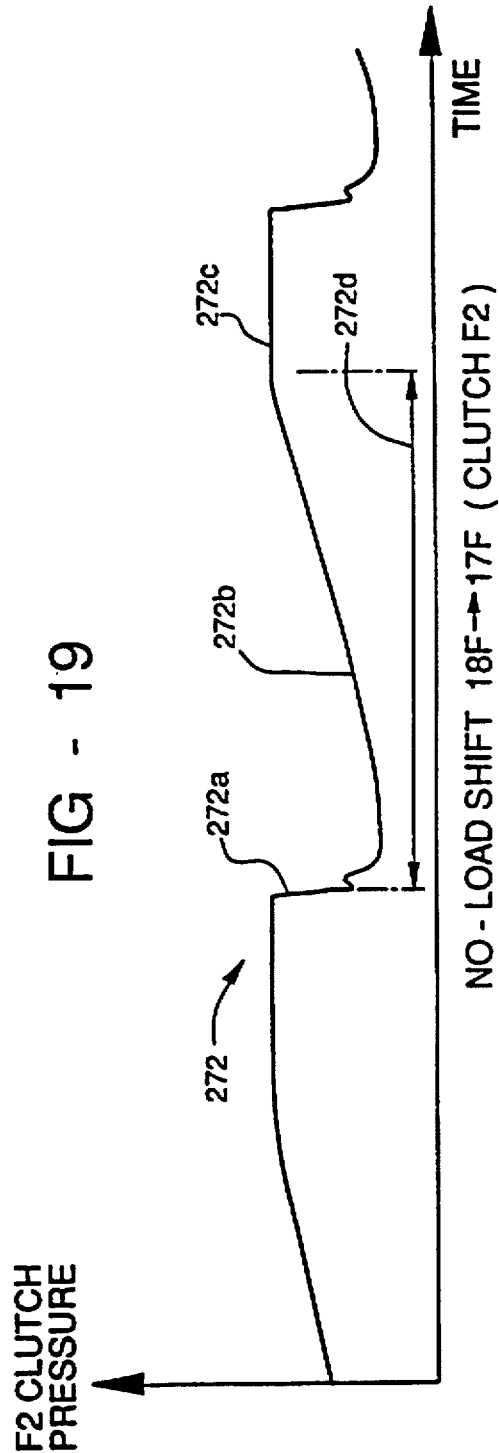

POWERSHIFT TRANSMISSION SYSTEM WITH TORQUE-MAPPED SHIFTS

CROSS-REFERENCE TO RELATED APPLICATION

This application is a continuation-in-part of application Ser. No. 08/176,201; filed Dec. 30, 1993 now U.S. Pat. No. 5,454,767, and entitled "Powershift Transmission System with Turbo Boost Monitor."

BACKGROUND OF THE INVENTION

1. Technical Field

This invention relates generally to electronically controlled powershift transmissions for large agricultural vehicles, and more particularly to a system and method for shifting the transmission of an agricultural or earth moving vehicle by controlling the engagement of a plurality of proportionally-modulatable clutches in accordance with the load being experienced by the vehicle as determined from the speed of the engine and the boost pressure developed by a turbocharger associated with the engine.

2. Discussion

Electronically controlled powershift transmissions are used in a wide variety of off-road vehicles including but not limited to large agricultural vehicles such as tractors and construction vehicles such as bulldozers, road graders and earth movers. These transmissions typically include a plurality of clutches which may be gradually modulated into engagement, as well as a plurality of "on-off" clutches which are not proportionally modulatable. Such transmissions also typically provide for a plurality of forward gear ratios as well as a plurality of reverse gear ratios. Shifting between any of the forward or reverse gear ratios, or between neutral and a forward or reverse gear ratio, typically involves engaging various combinations of the proportionally modulatable directional clutches and the on-off clutches to achieve the desired forward or reverse gear ratio. These vehicles experience a wide range of loading conditions including heavily-loaded field operations using an implement, partially-loaded operations such as partial implement engagement or rolling implement applications and lightly-loaded transport operations. These vehicles also experience a wide range of throttle conditions including part throttle and full throttle. Frequently an electronic transmission control system is employed for generating the current drive signals for such proportionally modulatable clutches. Examples of such control systems are disclosed in U.S. Pat. Nos. 4,855,913 to Brekkestran et al. and 4,425,620 to Batcheller et al., both of which are hereby incorporated by reference.

Engines associated with large agricultural or earth moving vehicles also frequently employ a turbocharger. As is well understood, turbochargers operate by receiving exhaust gasses from an exhaust manifold of the engine and using the exhaust gasses to drive a turbine of an input power section. The input power section is coupled to an output power section which also includes a turbine adapted to draw ambient air into the turbocharger. The ambient air drawn in is directed into the intake manifold of the engine and thereafter directed into the individual cylinders. The input power section and output power section are coupled together so that they always rotate synchronously. As the engine rpm increases, the rate of flow of the generated exhaust gasses increases which causes the turbocharger to draw in a greater amount of ambient air, and therefore develop a greater "boost" pressure in the intake manifold. Since the boost pressure increases almost as quickly as the engine torque developed, the boost pressure at any given time itself represents a very good approximation of the torque being generated at the same instant by the engine. Since engine torque increases generally in accordance with the loading on the vehicle, the boost pressure generated by the turbocharger represents a very good approximation of the current engine torque—and thus the load being experienced by the vehicle—at any given time.

Determining the load the vehicle is operating under before a shift is made is important during certain shifts where the proportionally modulatable clutches are modulated into engagement to accomplish the shift. This is because the load on the vehicle influences how quickly the shift should be executed. For example, if the vehicle is lightly loaded, a rapid shift (involving very rapidly modulating the pertinent proportionally modulatable directional clutch into complete engagement) will cause the vehicle to "lurch" significantly as the shift is completed. This condition is stressful not only on the internal components of the powershift transmission but also on the drive line components of the vehicle. Moreover, the lurch produced by a shift that is executed too quickly can add to operator fatigue as the vehicle is operated over a prolonged period of time where significant shifting is required.

Conversely, if the vehicle is heavily loaded when a shift is commanded by the operator, the vehicle will almost instantly decelerate, thus producing a significant, momentary "jolt" as an off-going proportionally modulated clutch disengages while an on-coming proportionally modulated clutch gradually is modulated into complete engagement. This condition is also hard on the internal components of the transmission as well as the drive line components of the vehicle. Additionally, the speed of the vehicle and/or engine torque may drop significantly during the time interval between the off-going clutch disengaging and the on-coming clutch fully engaging, thus causing the engine torque to drop below the peak point.

Therefore, it is highly desirable to tailor the rate of engagement of the proportionally modulatable clutch which is modulated into engagement during a shift from one gear ratio to the next depending upon the load which is being experienced by the vehicle, and thus the engine, at the instant just prior to the shift being executed. If the vehicle is operating under a no-load condition, preferably the proportionally modulatable clutch should be modulated into engagement at a slower rate of engagement to produce a "smooth" shift, and to prevent a lurch of the vehicle as the shift is executed. If the vehicle is heavily loaded, the modulatable clutch should be modulated into engagement much more quickly than during a no-load condition to avoid sudden deceleration of the vehicle as the shift is executed. Still further, it would be preferable to modulate the proportionally modulatable clutch into engagement at a rate somewhere between that which would be used for a no-load condition and that which would be used for a full-load condition, to thus tailor the rate at which the clutch is modulated into engagement in close accordance with the approximated load being experienced by the engine.

While modern powertrain systems employ a variety of sensors to determine engine and transmission operating conditions, at the present it is difficult to directly measure the engine load. Therefore, it is necessary to determine the engine load from known engine operating conditions. One satisfactory method of determining the engine load is to monitor the turbo boost pressure developed by a turbocharger associated with the engine and approximate the engine load from empirical data, that is, to say determine the engine load as a function of the turbo boost pressure. The empirical data is based on tests wherein the engine torque and turbo boost pressure are measured for a given throttle condition, typically full or wide-open throttle. Using this technique, an accurate engine torque, and hence engine load can be determined when the engine is operating at full throttle. However, if the engine is operating at less than full throttle (i.e., part throttle) this technique does not accurately approximate engine load, resulting in an inconsistent shift as heretofore described.

It is therefore a principal object of the invention to provide a method and apparatus for controlling the shifting of a powershift transmission in accordance with the load being experienced by the engine to thereby produce consistent shifts between various gear ratios of the transmission over the entire range of engine load and throttle conditions.

It is another object of the present invention to provide a method and apparatus for monitoring the speed of an engine and the boost pressure developed by a turbocharger associated with the engine of an agricultural vehicle and to use the sensed engine speed and turbo boost pressure to obtain an approximation of the load being experienced by the engine just prior to initiating the commanded shift, and to control the rate of engagement of a proportionally modulatable clutch needed to effect the commanded shift at a rate of engagement in accordance with the approximated engine load.

It is still another object of the present invention to provide a method and apparatus for controlling the engagement of a proportionally modulatable clutch of a powershift transmission of an agricultural vehicle such that when a proportionally modulatable directional clutch is involved in executing a shift, the directional clutch is caused to be engaged at a rate of engagement which is dependent upon the load being experienced by the vehicle just prior to the shift being initiated.

SUMMARY OF THE INVENTION

The above and other objects are provided by preferred methods and apparatus of the present invention for monitoring the speed of the engine and the turbo boost generated by a turbocharger of an engine of a vehicle, and controlling a powershift transmission of the vehicle in accordance with the sensed engine speed and turbo boost pressure. The method generally includes: monitoring the speed of the engine; generating an engine speed signal; monitoring the boost pressure generated by a turbocharger associated with the engine; and generating a turbo boost pressure signal in accordance therewith. The engine speed signal and the boost pressure signal are related to the engine torque being generated, which is in turn related to the load being experienced by the engine at a given time. The engine speed signal and the boost pressure signal are used to estimate the engine torque from a predetermined 3-D torque map relating the engine torque as a function of engine speed and turbo boost pressure information stored in a memory of an electronic controller system associated with the powershift transmission. The estimated engine torque is used to compute an engine load value from which a desired shift modulation profile can be determined. The desired shift modulation profile is such as to be able to effect control over an on-coming, proportionally modulatable clutch which is being engaged during the shift so as to engage the clutch at a predetermined rate of engagement dependent on the engine torque being produced by the engine, so as to produce a shift that does not cause any lurching, jolting or other sudden change in acceleration of the vehicle.

In the preferred embodiment, the turbo boost signal is modified by a calibration constant to accommodate vehicle-specific applications which removes variations from turbo boost sensor readings caused by tolerance differences and hardware of the controller system of the transmission, the turbo boost sensor and the engine. This produces a "normalized" turbo boost signal which is used in conjunction with the engine speed signal to determine an engine load value from the 3-D torque map data. Thus, the engine load value takes into account variations in the engine load due to part throttle.

In the preferred method, the engine load value is ratio-nalized against the stored full-load and no-load values to determine the percentage of full-load at which the engine is operating, i.e., percentage load. If the engine load value is at or below the predetermined no-load value, which represents the engine operating at wide open throttle ("WOT") without being subjected to any external load, then a pulse-width-modulated ("PWM") signal is generated in accordance with a predetermined no-load duty cycle and predetermined no-load time value to modulate the on-coming directional clutch into engagement within the predetermined no-load time interval. If the engine load value is above the predetermined full load value, which represents the engine operating at wide open throttle ("WOT") under a full-load, then a PWM drive signal having a predetermined full-load duty cycle for a predetermined full-load time value is generated for modulating the on-coming directional clutch into engagement at a predetermined rate of engagement.

If the engine load value is between the predetermined no-load and full-load values, the percentage load is used to linearly scale the PWM duty cycle and time value associated with the full-load shift modulation profile, thus causing the on-coming modulated directional clutch to be modulated into engagement at a rate of engagement, and for a time period, which are each a percentage of those values which would be used to implement a full-load shift. Thus, the percentage load varies the shifting profile due to part load conditions.

BRIEF DESCRIPTION OF THE DRAWINGS

The various advantages of the present invention will become apparent to one skilled in the art by reading the following specification and subjoined claims and by referencing the following drawings in which:

FIG. 10 is an exemplary listing of the boost multipliers which may be applied at various engine speeds to compensate for the dropping boost pressure that would be experienced as the engine begins to lug down in response to an external load;

FIG. 18 is a graph of the pressure over time applied to the F2 clutch during downshifting from gear 11F to gear 10F under a no-load condition; and FIG. 19 is a graph of the pressure over time applied to the F2 clutch during a downshift from gear 18F to gear 17F under a no-load condition.

DETAILED DESCRIPTION OF THE PREFERRED EMBODIMENTS

Figure 1:
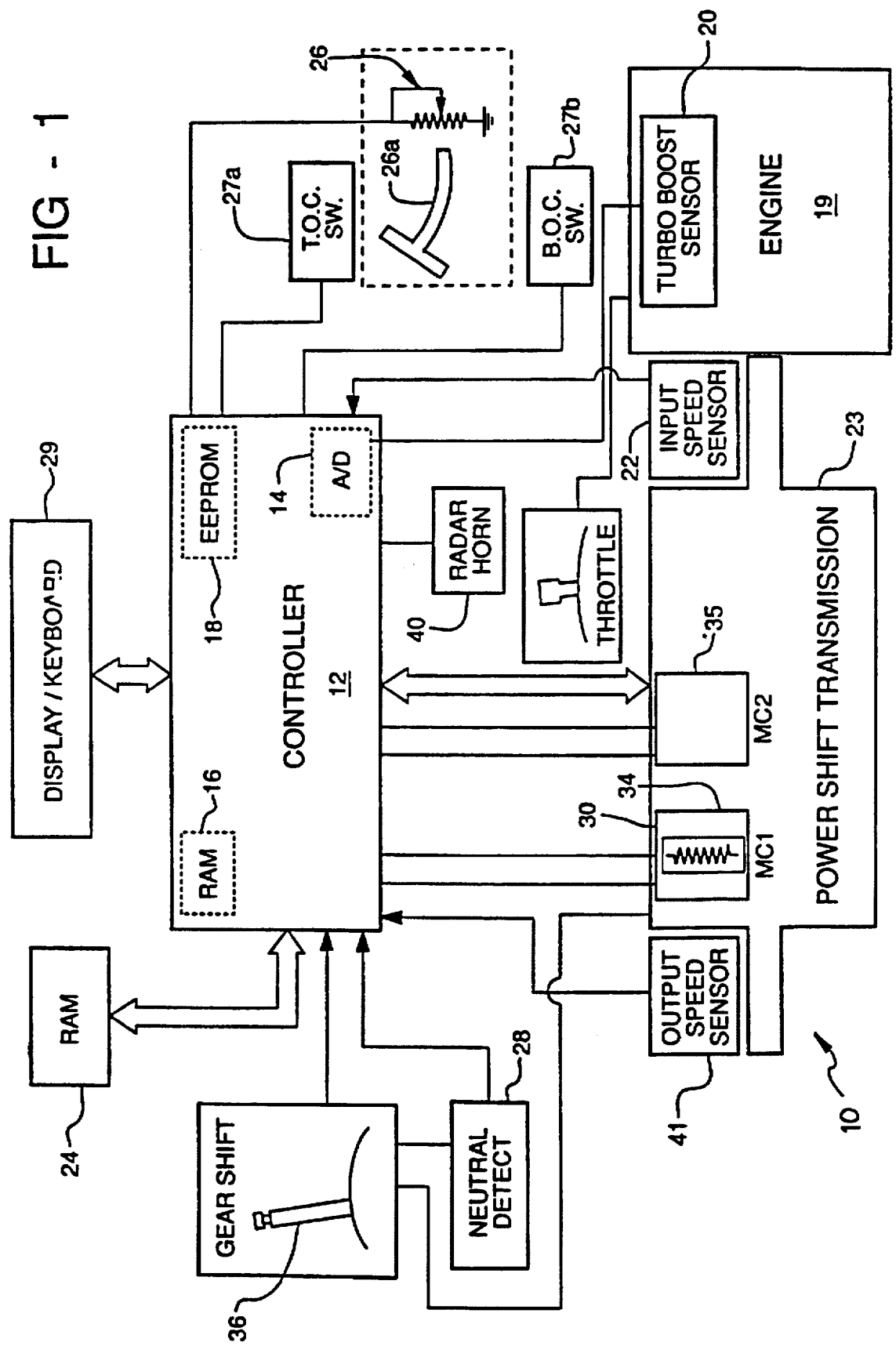
FIG. 1 is a simplified block diagram of a turbo boost control system in accordance with the present invention.

Referring to FIG. 1, there is shown a simplified block diagram of an electronic transmission control system which may be used in connection with the preferred method of the present invention. The system 10 generally includes an electronic controller 12 having an internal analog-to-digital (A/D) converter 14, an internal random access memory (RAM) 16, and an internal, electrically erasable, programmable read only memory (EEPROM) 18.

A turbo boost pressure sensor 20 is coupled to an input port of the controller 12 as is a conventional engine speed sensor 22. The turbo boost pressure sensor is used to measure the boost pressure developed by a turbocharger associated with an engine 19 of the vehicle and preferably produces about 1.5 volts at 100 kPa, and 3.5 volts at 200 kPa. The engine speed sensor 22 is preferably a variable reluctance magnetic pick-up (VRMP) sensor which monitors a gear on the input shaft of a powershift transmission 23, whose speed is representative of the input shaft of the powershift transmission 23 of the vehicle. In the preferred embodiment the VRMP sensor 22 monitors a gear having 42 equally spaced teeth. The controller 12 divides the signal generated by the sensor 22 by a factor of 16, giving the controller 12 a signal of 2.625 pulses per revolution. This provides a signal equivalent to about 0.04375 Hz per rpm. An output shaft speed sensor 41 is also included which also is in the form of a VRMP type sensor. This sensor preferably monitors the speed of a gear having 72 approximately spaced teeth and provides a signal equivalent to 1.2 Hz/rpm. Optionally, a true ground speed sensor, such as a radar horn 40, may be included to provide an indication of true vehicle ground speed.

The system 10 further preferably includes external inching clutch pedal position sensor 26 for an inching clutch pedal 26a, a top-of-clutch position switch 27a, a bottom-of-clutch pedal position switch 27b, a neutral detection sensor 28, a display/keyboard 29 mounted within the vehicle interior and means for modifying the drive signal used to modulate proportional valve MC1 (indicated by reference number 34 and hereinafter referred to as "valve MC1 34") associated with directional clutch F1 and proportional valve MC2 (indicated by reference number 35 and hereinafter referred to as "valve MC2 35") associated with directional clutch F2 to compensate for varying operating temperatures which affect the operation of valves MC1 34 and MC2 35. For example, at a first temperature, $T_1$, a 50% duty cycle may be required to appropriately position valve MC1 34. However, at a second temperature, $T_2$, which is greater than $T_1$, a duty cycle of 67% may be required to appropriately position valve MC1 34. Thus, means for modifying the drive signal are provided to compensate for the above-described variations in the performance of valves MC1 34 and MC2 35 due to temperature changes. The controller 12 is further responsive to a shift control lever 36 for selecting various gear ratios of the powershift transmission 23, as well as directional modes of operation (i.e., either forward or reverse).

One means for modifying the drive signal includes a temperature sensor 30 for measuring the coil temperature of valve MC1 34. While temperature sensor 30 is preferably a thermistor, any device which provides a voltage signal indicative of the coil temperature of valve MC1 34 may be suitably used in the present invention. The coil temperature of valve MC2 35 may be assumed to be equal to that of valve MC1 34 or, alternately, a second temperature sensor may be employed to measure the coil temperature of valve MC2 35. The drive signals used to modulate valves MC1 34 and MC2 35 are compensated using these temperature values.

An alternate means for modifying the drive signal includes a temperature sensor for measuring the temperature of the hydraulic fluid flowing through valve MC1 34 and a current measuring sensor for determining the electrical current flowing through the coil of valve MC1 34, the combination being indicated by reference number 30. While the temperature sensor 30 is preferably a thermistor, any device which provides a voltage signal indicative of the temperature of the hydraulic fluid flowing through valve MC1 34 may be suitably used in the present invention. Similarly, while the current measuring.device 30 is preferably an ammeter connected between the high side of the coil of valve MC1 34 and ground, any device which provides a voltage signal indicative of the current flowing through of the coil of valve MC1 34 may be suitably used in the present invention. The temperature of the hydraulic fluid flowing through valve MC2 35 and the current flowing through the coil of valve MC2 35 may be assumed to be the same as that measured for MC1 or may be measured with independent sensors. The drive signals used to modulate valves MC1 34 and MC2 35 are compensated using these temperature and current values.

In the preferred embodiment the controller 12 is represented by a Motorola 68HC11E1 microprocessor which is operated in its expanded mode. For purposes of illustration only, the methods of the present invention will be described while making reference to a Funk 9400 series powershift transmission, which is manufactured by the Funk Corporation of Coffeyville, Kans. This particular model of transmission provides 18 forward and 9 reverse gear ratios which are selected by engaging combinations of hydraulic clutches via solenoid control. The clutches are divided into three groups of three clutches, identified as "number" clutches 1, 2 and 3, "letter" clutches A, B and C, and "directional" clutches F1, F2 and R. The desired gear ratio is selected by engaging one clutch from each group. The directional clutches F1 and F2 are involved whenever a shift from gear 9F to gear 10F or gear 10F to gear 9F is commanded. The R directional clutch is involved when shifting from neutral to any reverse gear. Clutch F1 is involved when shifting from neutral to gears 1 F–9F. Clutch F2 is involved when shifting into any of gears 10F–18F.

Each of the nine clutches further has an "on/off" solenoid which allows the clutch to engage when power is applied. The valves MC1 34 and MC2 35 shown in simplified form in FIG. 1 are used to control the pressure to the directional clutches F1, F2 and R. Valve MC1 34 controls pressure to the F1 directional clutch while proportionally modulatable valve MC2 35 controls pressure to both the F2 and R directional clutches. Valves MC1 34 and MC2 35 cause decreasing clutch pressure with increasing current and are ideally suited for use with pulse-width-modulated (PWM) current drive signals generated by the controller 12. Put differently, as the duty cycle of the drive signal to either one of valves MC1 34 or MC2 35 is increased, this causes decreasing hydraulic pressure which allows the Belleville springs associated with the directional clutch to urge the clutch into engagement. The presently preferred embodiments do not contemplate controllably varying the rate of engagement of the R (reverse) directional clutch, as is done with the F1 and F2 directional clutches. However, it will be appreciated that the teachings set forth herein could readily be applied, if desired for a specific application, by those of ordinary skill in the art to also vary the rate of engagement of the R directional clutch.

DETERMINATION OF FULL-LOAD AND NO-LOAD SHIFT MODULATION PROFILES

The preferred methods of the present invention incorporate the use of predetermined shift modulation profiles for no-load and full-load shifts. The no-load and full-load shift modulation profiles each represent a "pressure vs. time" shift profile which is intended to bring the involved on-coming clutch into engagement at a predetermined rate of engagement. The full-load and no-load shift modulation profiles are used by the controller 12 to generate PWM drive signals each having a suitable duty cycle, for a suitable time, to produce the desired pressure vs. time shift profile. Accordingly, when a full-load shift is desired, for example, the controller 12 generates a PWM signal having a duty cycle sufficient to modulate the on-coming directional clutch (i.e., clutch F1 or F2) into engagement at the desired rate of engagement, for the desired time period, to match the predetermined full-load pressure vs. time curve. Put differently, the PWM signal controls the rate at which the proportional solenoid valve being modulated (i.e., either valve MC1 or MC2) is opened, for a specific, predetermined time period, to accomplish the full-load shift.

Figure 2:
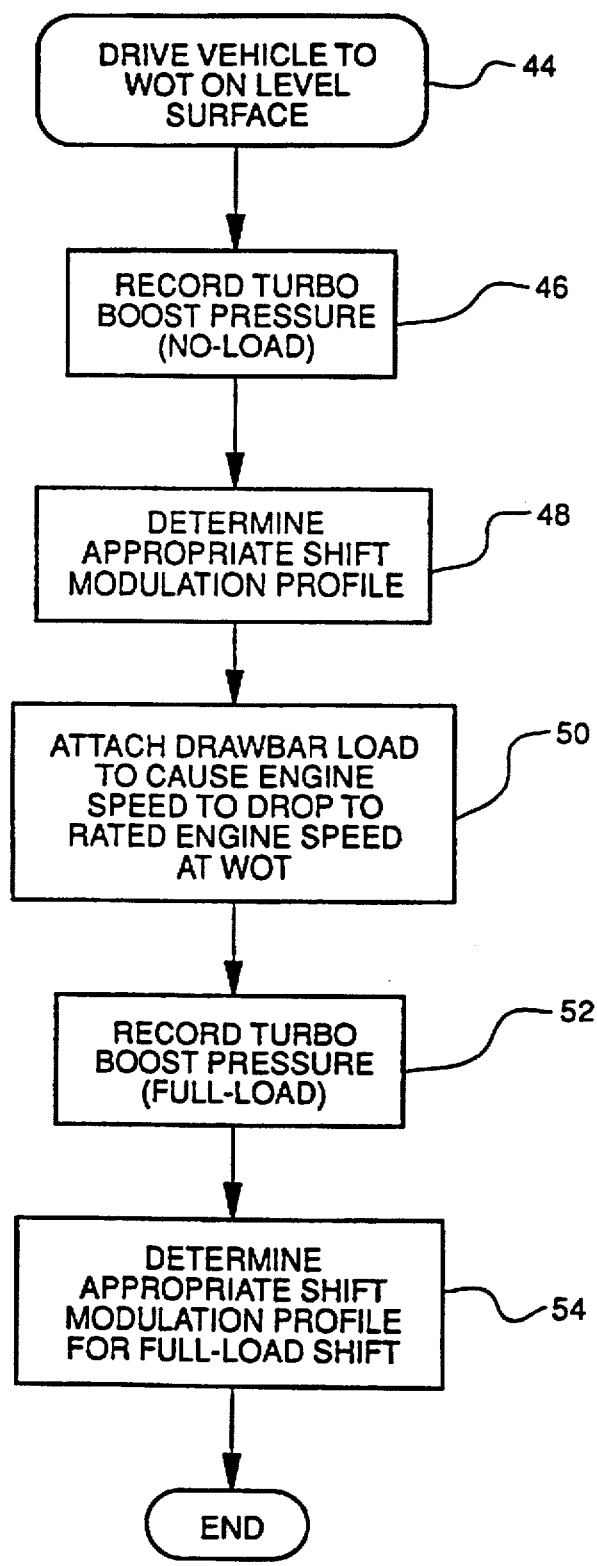
FIG. 2 is a flow chart illustrating the calibration procedure undertaken to determine the turbo boost value under full-load and no-load conditions.

With brief reference to FIG. 2, the steps used to determine the full-load and no-load shift modulation profiles are presented. As indicated by the reference to a "predetermined" profile, these steps are preferably performed once during the development of the transmission system. The full-load and no-load shift modulation profiles are then stored in memory of the controller 12 for use as further described herein. Initially, the vehicle is driven on a level surface, and preferably a concrete surface to minimize the drag on the vehicle, until a wide open throttle (WOT) condition is achieved, as indicated at step 44. Next, the turbo boost pressure reading (i.e., value) from the turbo boost pressure sensor 20 and the engine speed from the engine speed sensor 22 are recorded under a no-load condition, as indicated at step 46. At step 48, the appropriate no-load shift modulation profile is determined to provide a desired rate of engagement for any one of the directional clutches when a shift is commanded under a no-load condition. This is determined by trying different duty cycle values and time values until a combination is decided on which produces the appropriate "feel" for a shift under a no-load condition. Such a shift, as mentioned previously, is preferably one which takes place rapidly but without vehicle jolt or lurch.

With continued reference to FIG. 2, a drawbar load is then attached to the vehicle which is sufficient to cause the engine speed at wide open throttle to drop to "rated" engine speed for the particular engine being used. As will be appreciated, the rated engine speed of an engine is understood to mean that engine speed which causes the engine to produce its peak torque. This procedure is indicated at step 50. At step 52, the turbo boost pressure from the turbo boost pressure sensor 20 and the engine speed from the engine speed sensor 22 are recorded, which represents the boost pressure value and the engine speed value under a full-load condition. Next, as indicated at step 54, an appropriate shift modulation profile (i.e., pressure vs. time) curve is determined to produce a desired rate of engagement for a shift made under a full-load condition. More specifically, an appropriate duty cycle and time period will be determined, through repeated experimentation, which cause the on-coming directional clutch to engage at a rate of engagement and within a desired time. This rate of engagement and time period will be such as to produce a shift which is rapid enough to prevent the engine rpm from dropping appreciably while the shift is being executed, to thereby produce a smooth shift without sudden vehicle deceleration.

When the vehicle engine is experiencing a part-load condition (i.e., somewhere in between no-load and full-load), the pressure vs. time shift modulation profile is modified (i.e., reduced) by the percent value of full-load as determined from one of the engine load approximation techniques described hereafter. For example, if the estimated engine load is approximately 50% of the full load, the PWM duty cycle is then modified by the controller 12 to produce a pressure versus time shift modulation profile which causes the appropriate on-coming directional clutch to engage at a rate of engagement, for an appropriate time period, which is approximately 50% of that rate at which it would engage if under a full-load condition, and for approximately half the predetermined full-load time period. Similarly, if the engine load value was approximately 75% of the full load, then a duty cycle would be generated which causes the appropriate on-coming clutch to engage at a rate of engagement, and for a time period, which are approximately 75% that of the rate and time that would be utilized under a full-load shift condition.

From the above, it can be seen that by first determining the boost pressures and engine speeds under full-load and no-load conditions, the load at which the engine is operating under at any given time can then be estimated from the instantaneous boost pressure and engine speed which is then rationalized as a percentage of the full-load. The estimated engine load can thus be utilized to provide a very good approximation of the actual load at which the engine is operating under and, therefore, the rapidness of the shift which should be executed to prevent unwanted vehicle lurch, jolt or sudden change in acceleration. It should be appreciated that the quality of a shift, that is to say whether a shift is smooth or rough is subjective, and thus, based upon personal preference. The present invention provides a means for achieving consistent shifts over the range of engine loading conditions from no-load to full-load based on that subjective determination.

BOOST CALIBRATION PROCEDURE

Figure 3:
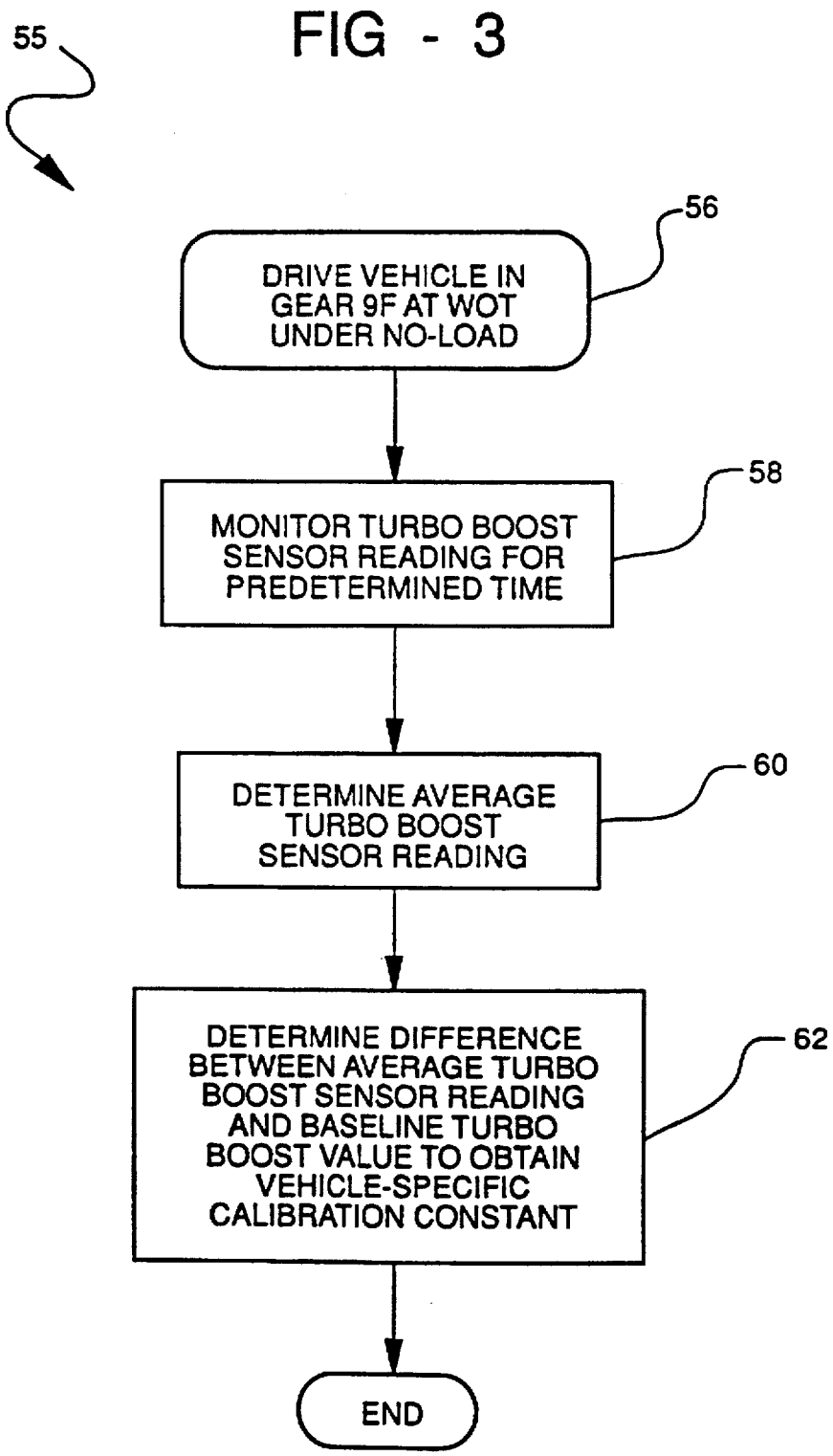
FIG. 3 is a flow chart of a calibration procedure used to obtain a vehicle specific calibration constant to be added to the turbo boost signal to compensate for variations in the turbo boost pressure from vehicle to vehicle.

To improve the vehicle-to-vehicle consistency of loaded shifts, the turbo boost sensor 20 (FIG. 1) is calibrated preferably "on-vehicle". Referring to FIG. 3, this procedure is shown in simplified form in connection with flow chart 55. A more detailed explanation of this calibration procedure will be provided in connection with the flow chart of FIG. 9. Initially, the vehicle is driven on a level surface under a full-throttle, no-load condition in gear 9F, as indicated at step 56. The turbo boost sensor 20 is then monitored for a predetermined time, for example, preferably about three seconds, as indicated at step 58. Multiple readings of the turbo boost sensor 20 are taken during this time period. Next, an "average" turbo boost sensor reading is determined, as indicated at step 60, from the multiple readings obtained at step 58. Next, the difference between a predetermined "baseline" turbo boost value and the average turbo boost sensor reading is determined, as indicated at step 62, which represents the variation of the average turbo boost sensor reading from the predetermined, baseline value. This difference (i.e., offset) represents a vehicle-specific calibration constant which takes into account the variations caused by tolerance differences in the system hardware, the turbo boost pressure sensor 20 itself, the engine itself, and virtually any other factor that influences the reading of the boost sensor 20.

BASIC OPERATIONAL OVERVIEW

Figure 4:
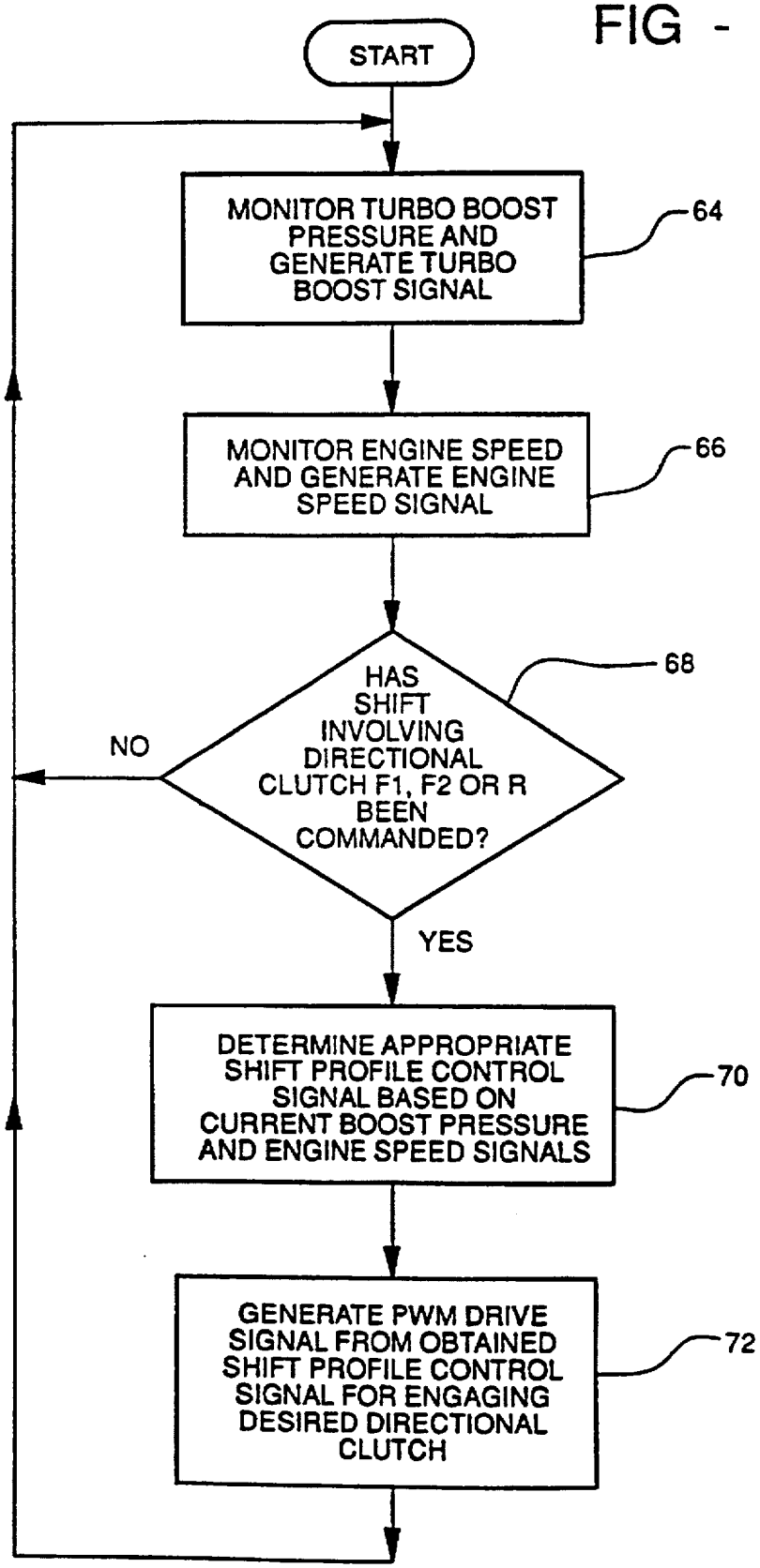
FIG. 4 is a simplified flow chart of the basic steps performed by the preferred method of the present invention showing the optional step of monitoring the engine speed and generating the engine speed signal by which the sensed turbo boost pressure can be further modified to compensate for decreasing boost pressure when the engine rpm drops due to the engine lugging down from excessive load.

Before explaining in significant detail the numerous steps implemented during operation of the preferred methods of the present invention, a simplified overview of the steps performed is presented in FIG. 4. Initially, the controller 12 monitors the turbo boost pressure from the boost sensor 20 and generates a turbo boost signal indicative of the boost pressure being developed by the turbocharger of the vehicle engine, as indicated at step 64. Next, an engine speed signal is read from the engine speed sensor 22 (FIG. 1), as indicated at step 66.

In one preferred method, step 66 is optional but preferred in view of the fact that the turbo boost pressure typically falls off slightly when the engine is operated under load conditions which exceed the peak torque output of the engine. Put differently, as the load on the engine increases, a point will be reached where the engine is producing peak torque, which will also represent the maximum boost pressure generated by the turbocharger. If the load is increased beyond this point, the engine rpm will drop slightly, which will also cause the boost pressure to drop slightly. This is an undesirable condition as the controller 12 would sense that the load on the vehicle, and thus the engine, is decreasing when in fact the load is actually increasing, unless this situation is compensated for. This will be explained in more detail momentarily.

In an alternate preferred method, step 66 is required in view of the fact that both the turbo boost pressure and the engine speed are used to calculate the engine load. This alternate method accommodates variations in engine torque resulting from engine speed variations since the engine torque is computed as a function of both the turbo boost signal and the engine speed signal. In this way, the engine torque is more accurately estimated based on the operating conditions of the engine.

Returning to FIG. 4, the controller 12 then determines if a shift involving directional clutch F1, F2 or R has been commanded by the operator, as indicated at step 68. If not, the turbo boost pressure signal and engine speed signal are updated, as indicated at steps 64 and 66. If so, the controller 12 determines the appropriate shift modulation profile, as indicated at step 70, based on the sensed turbo boost signal and the engine speed signal.

With further reference to step 70 of FIG. 4, at this point the controller 12 determines a shift profile control signal from the estimated engine load which is approximated from the turbo boost signal and engine speed signal. In one preferred embodiment, the controller 12 conditions the turbo boost signal by an engine speed "constant" value which compensates for the drop in turbo boost which would occur if the engine speed has begun to drop. In other words, if the engine is being loaded such that peak torque has been exceeded (i.e., the torque has thus begun to drop), then the monitored turbo boost signal is multiplied by the engine speed constant to keep the turbo boost signal from dropping and thereby erroneously indicating to the controller 12 that the load of the vehicle is decreasing, when in fact the load is increasing. The controller 12 then computes an estimated engine load from the conditioned turbo boost signal which is used to determine the shift profile control signal. This will be explained more fully in connection with the flow chart of FIG. 9.

In an alternate preferred method, an estimated engine load value is computed directly as a function of the engine speed and the turbo boost pressure, instead of as a function of the turbo boost pressure which has been conditioned based on the engine speed. The computation of the engine load value in accordance with the alternate preferred method will be explained more fully in connection with the flow chart of FIG. 9A.

Lastly, the controller 12 generates the PWM drive signal with an appropriate duty cycle, for an appropriate time, in accordance with the shift modulation profile (either full-load or no-load) for the appropriate directional clutch as shown at step 72. This then causes the appropriate directional clutch to be modulated into engagement at the appropriate rate of engagement depending upon the vehicle load. Thus, by determining the turbo boost pressure being generated at a given time and the engine speed of the vehicle at the same time, a very good approximation of the engine load can be determined, which can then be used to determine the appropriate rate of engagement of the on-coming directional clutch when a shift is made.

It will be appreciated that while the engine torque computed from the conditioned turbo boost signal or the engine load value is assumed to represent purely drawbar load, when in fact it also includes the engine load associated with driving the power take-off (PTO). The methods described herein could readily be modified by those skilled in the art to avoid compensating for load imposed on the engine by the PTO. This could readily be accomplished provided a suitable torque sensor is used to monitor the torque of the PTO and by factoring in the sensed PTO torque, at a given time, into the conditioned turbo boost signal or engine load value. As an example, it may not be desirable to execute a rapid shift, which would normally be produced when a rear maximum boost pressure signal is present, if it is determined that a large amount of engine power is being used to drive the PTO of the engine and the vehicle is travelling at a relatively low ground speed. In this instance it would be more desirable to modify the PWM drive signal to provide a more gradual degree of clutch engagement.

DETAILED OPERATION

Figure 5:
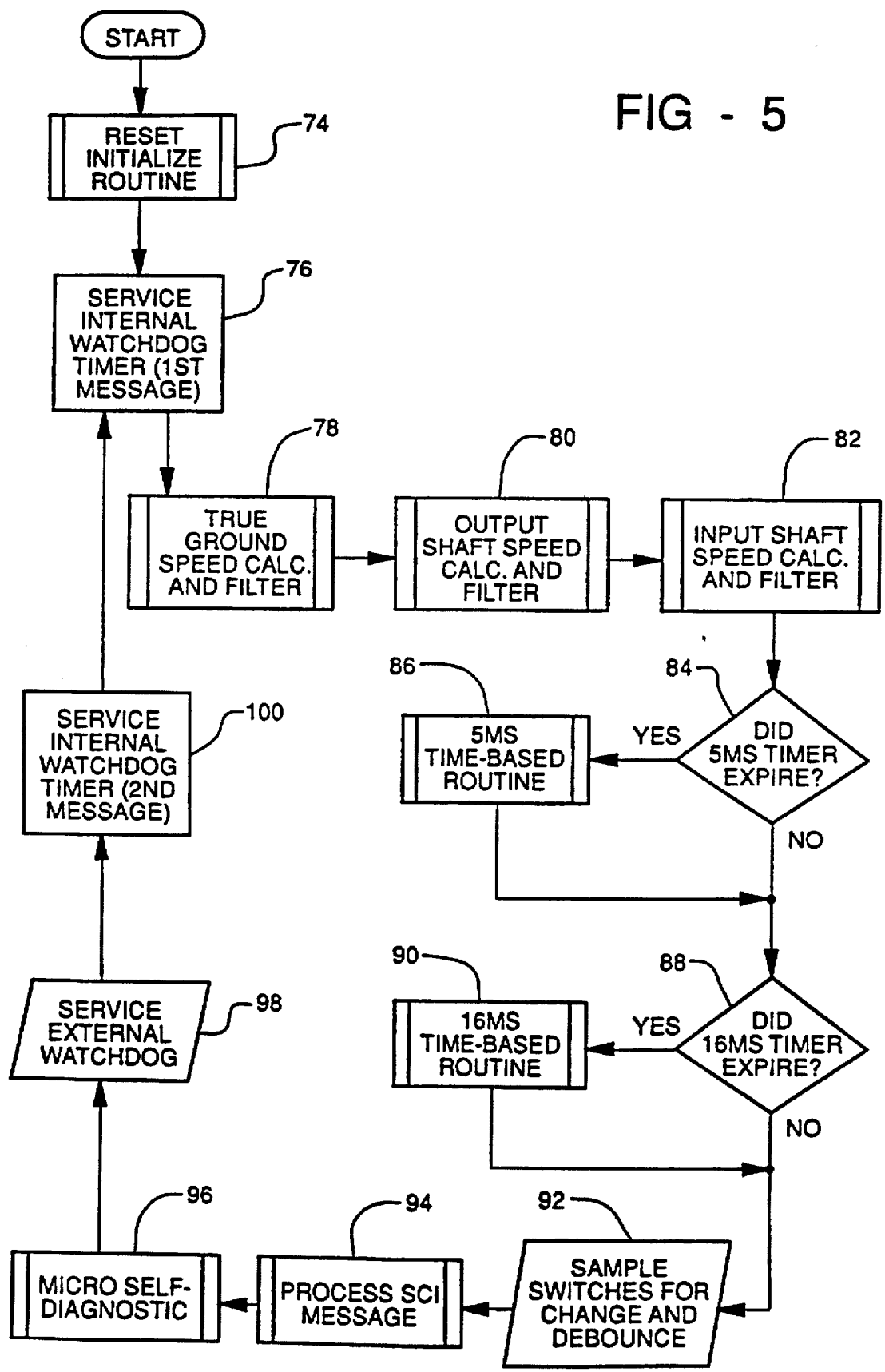
FIG. 5 is a flow chart of the main loop of the software program used to implement the preferred method of the present invention.

Referring now to FIGS. 5–12, the detailed operation of the preferred methods of the present invention will be discussed. Referring to the flow chart of FIG. 1, the overall sequence of steps performed by the software used to implement the methods of the present invention is shown. FIG. 5 thus represents one complete cycle which is performed by the controller 12, which will be referred to hereafter as the microprocessor 12. The execution time of the steps illustrated in FIG. 5 rarely exceeds 4 ms, and many times is less than 1 ms.

The first step is the execution of a "reset initialize" routine, as indicated at step 74. On power-up (or any other reset condition), the registers of the microprocessor 12 are configured as required. The outputs of the microprocessor 12 are configured to an initial reset state. The interrupts of the microprocessor 12 are disabled, but the interrupt masks are configured as desired. The checksum of the operational code associated with the software of the present invention is calculated and verified to ensure no memory upsets have occurred. If the checksum fails, the microprocessor 12 will not execute any additional software code.

With continued reference to step 74 of FIG. 5, the internal microprocessor RAM 16 is tested and set to zero. If any of the RAM tests fail, the microprocessor 12 will not execute any additional software code. Further necessary information is retrieved from the microprocessor's internal EEPROM 18. This information includes the maximum forward gear desired (for example, 18 when using the Funk 9400 series transmission), vehicle specific clutch calibration values for F1, F2 and R clutches, the inching pedal position sensor 26 minimum and maximum voltage readings, and the turbo boost sensor 20 calibration values. All fault codes are also cleared. The microprocessor's internal EEPROM-based CONFIG register is checked to ensure proper operation of the controller. If the CONFIG register is not correct, the software of the invention will attempt to reprogram this register, and program execution will continue. The internal timers are configured as required and the interrupts are enabled as configured. The transmission of the vehicle is set to neutral and the default forward and reverse gears are initialized as desired. In the preferred embodiment the default forward gear is sixth gear and the default reverse gear is third gear reverse.

Referring now to FIG. 5, step 76, the software begins executing the steps of the main loop, which comprises steps 76–100. At step 76, the microprocessor's 12 internal watchdog timer is serviced. The watchdog service messages are stored in two RAM locations which are initialized in the reset initialize routine (step 74). The first watchdog service byte is written to the watchdog at the beginning of the main loop. The second message is written at step 100, at the end of the main loop. Once out of the reset routine (step 74), no other watchdog service points are present. This ensures that the software is executing the complete loop and that the time through the loop is not excessive. In addition, by having the watchdog service values in RAM, it is possible to recover from RAM upsets through the internal watchdog resets if the wrong values are written. This also ensures that the microprocessor 12 has gone through a valid reset before execution of code is allowed. For increased security, these two values are preferably placed at the end of user RAM so that any stack overflows in the microprocessor 12 will overwrite these values, and execution of the software will be stopped by the watchdog reset from these messages being corrupted.

With continued reference to FIG. 5, at step 78 the microprocessor 12 reads the port coupled to the optional radar horn 40, if such a device is being used. This provides a true ground speed signal to the microprocessor 12 should same be desirable for any purpose. It will be appreciated, however, that this step is optional and is not essential to the main loop.

At step 80, the speed of the output shaft of the powershift transmission is determined by reading the port coupled to the output shaft speed sensor 41. As stated earlier, the signal of the output shaft speed sensor, which is a VRMP sensor, is equivalent to about 1.2 Hz per rpm. Approximate wheel speed is calculated by assuming that at about 151.48 rpm the vehicle is traveling at 1.0 mph. Those skilled in the art will appreciate, however, that wheel size will affect this calculation as will tire wear.

At step 82, the input shaft speed is calculated and filtered. This is accomplished by the microprocessor 12 reading the port coupled to the input shaft VRMP (i.e. engine speed sensor 22). At step 84, an inquiry is made to determine if a 5 ms timer started immediately after the reset initialize routine (step 74) has expired. If so, a 5 ms time-based routine is executed, as indicated at step 86 before the next step in the main loop is executed. The 5 ms time-based routine will be described in greater detail momentarily. Essentially, however, this routine involves performing certain diagnostics, updating the values from the microprocessor's 12 internal A/D converter 14 and checking for various faults of any of the output drivers or solenoids.

With continued reference to FIG. 5, the software checks to determine if a 16 ms timer configured in software has expired, as indicated at step 88. This timer is also started immediately after the reset initialize routine (step 74). If the 16 ms timer has expired, a 16 ms time-based routine is executed, as indicated at step 90. Briefly, this routine involves checking and updating a number of operational parameters involving the present state of switches which indicate the position of the shift lever 36 (i.e., what gear ratio and directional mode is commanded), performing engine speed compensation calculations involving the engine speed compensation values, scaling the turbo boost sensor reading based on the turbo boost calibration value, and other operations. This routine will also be discussed in more detail momentarily.

After the 16 ms timer has expired or the routine at step 90 has been performed, the digital switch inputs of the microprocessor 12 are sampled and the results are used to determine when any switch associated with the shift lever 36 has changed state and has been debounced in a separate time-based debounce loop, as indicated at step 90. The specifics of this debounce loop are disclosed U.S. Pat. No. 5,388,476, which issued on Feb. 14, 1995 and is entitled GEARSHIFT MECHANISM, and is hereby incorporated by reference.

Next, the serial communications interface port is polled by the microprocessor 12 to see if a message has been received thereat by any external device in communication with the microprocessor 12. If it has, the message request is processed, a response message is formed, and the transmission of the response is initiated, all as indicated at step 94. In this regard it will be appreciated that since the microprocessor 12 is afforded the capability of serial communications, the microprocessor 12 can be interfaced with an external development tool should one wish to reprogram any of the stored constants, such as the engine speed compensation values, should this be desirable.

At step 96, a micro self-diagnostic routine is executed which refreshes the control registers and performs various tests on the RAM of the system, in addition to performing other routine tests for the microprocessor 12. At step 98, the microprocessor 12 is required to service an external watchdog. Essentially, the microprocessor 12 is required to toggle an output port thereof within approximately 16 ms to prevent an external watchdog timer from resetting the microprocessor 12. At step 100, the second service message is written at the end of the main loop as explained hereinbefore.

Figure 6:
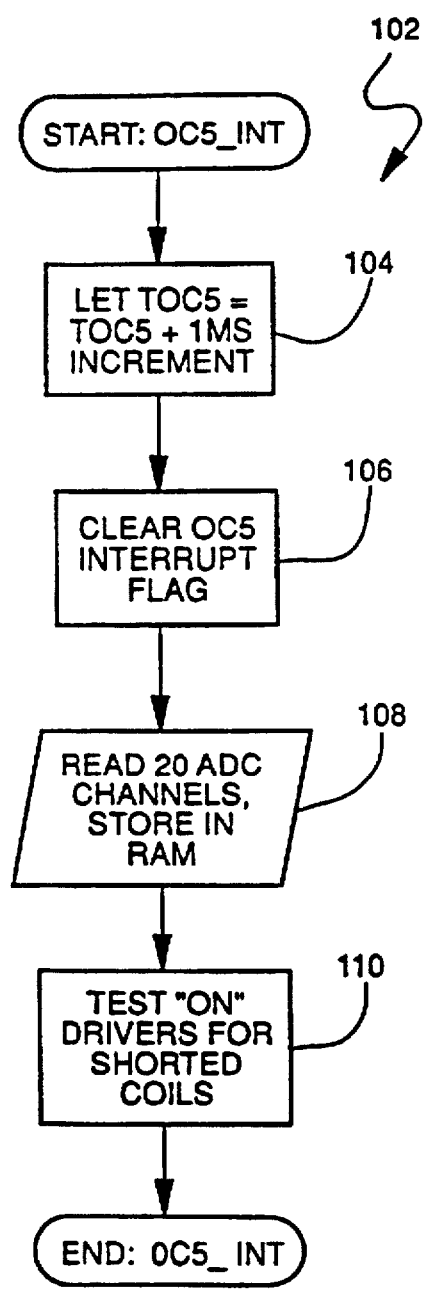
FIG. 6 is a flow chart of an interrupt routine which is used to read the channels of the A/D converter and to test the solenoids of the transmission for shorted coils.

Referring briefly now to FIG. 6, there is shown an interrupt routine 102 which is labelled the "OC5 interrupt". This interrupt occurs every 1 ms, as indicated at step 104. Immediately after the interrupt occurs, the OC5 interrupt flag is cleared, as indicated at step 106, and the internal A/D converter 14 channels are read and the results thereof stored in the RAM 16 of the microprocessor 12 (FIG. 1), as indicated at step 108. Next, the solenoid drivers which are currently "on" are tested to determine if the coil of the solenoid associated therewith is shorted, as indicated at step 110. Approximately 1 ms later, and every 1 ms thereafter, this routine is repeated.

Figure 7:
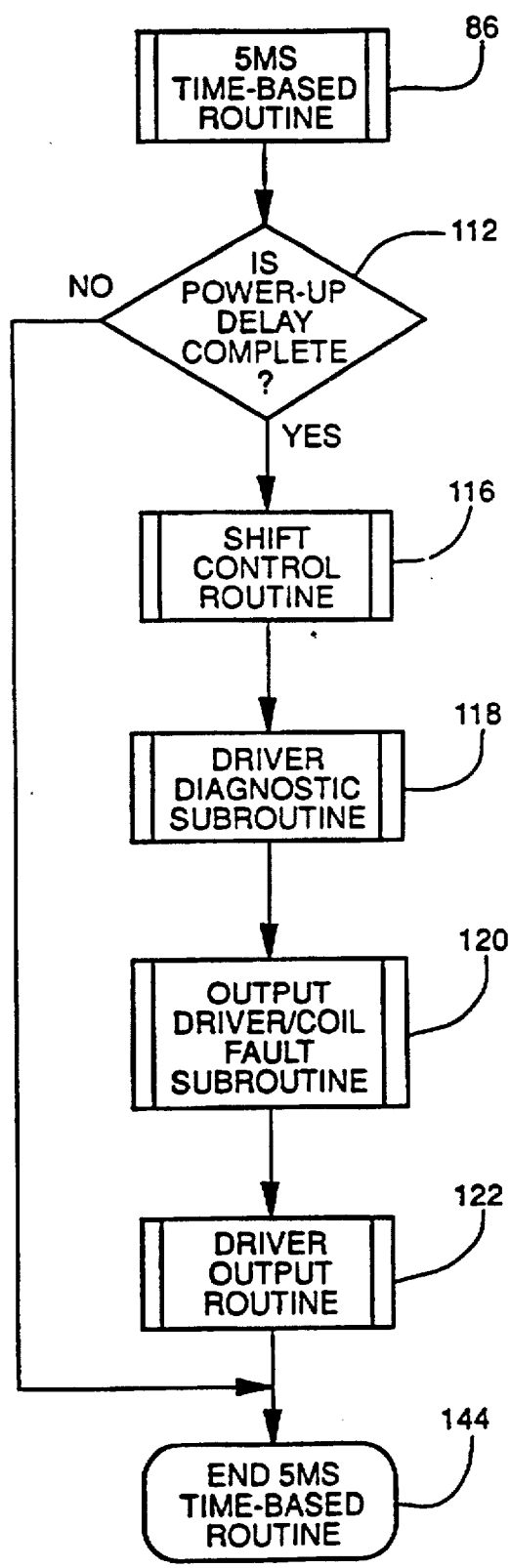
FIG. 7 is a flow chart of the steps implemented to check the solenoid coils for faults and to generate the driver output signals for the solenoid coils which need to be energized at a given time.

Referring now to FIG. 7, the 5 ms time-based routine indicated at step 86 in FIG. 5 is shown in more detail. The first step in this routine involves checking to determine if a 0.5 second delay after power-up has passed, terminated, as indicated at step 114. If the 0.5 second delay has occurred, a shift control routine is executed, as indicated at step 116. This routine essentially involves setting up and handling all of the solenoid patterns and duty cycles required to implement a shift and to maintain (i.e., refresh) the solenoids and duty cycles needed to maintain operation in the currently selected gear. Next, a driver diagnostic subroutine is executed, as indicated at step 118, which checks to determine if the solenoid drivers that need to be turned on to effect a shift are in fact functional (i.e., not shorted or open).

An output driver/coil fault subroutine is executed next, as indicated at step 120, which analyzes any faults determined to exist at step 118. The subroutine of step 120 also attempts to pick a gear which is closest to the desired gear commanded by the operator which cannot be used because of a fault with a component associated therewith. At step 122, a driver output routine is executed which causes the appropriate currents to be applied to the solenoids to be turned on to either implement a shift or maintain operation in a desired gear.

16 MS TIME BASED ROUTINE

Figure 8A:
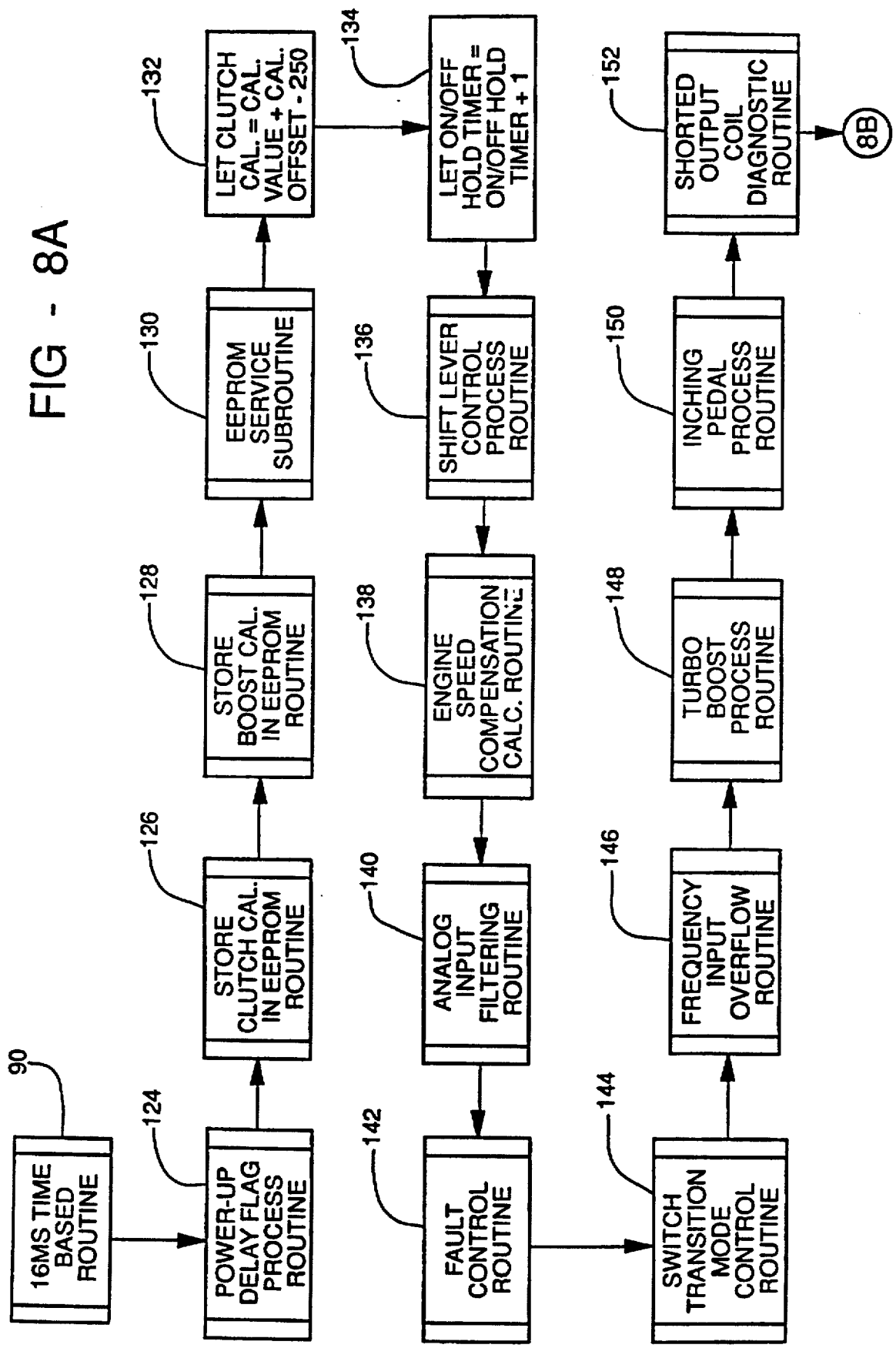
FIGS. 8A and 8B are a flow chart of the 16 ms time based routine showing the various operations that are performed to check the various sensors of the system of FIG. 1.
Figure 8B:
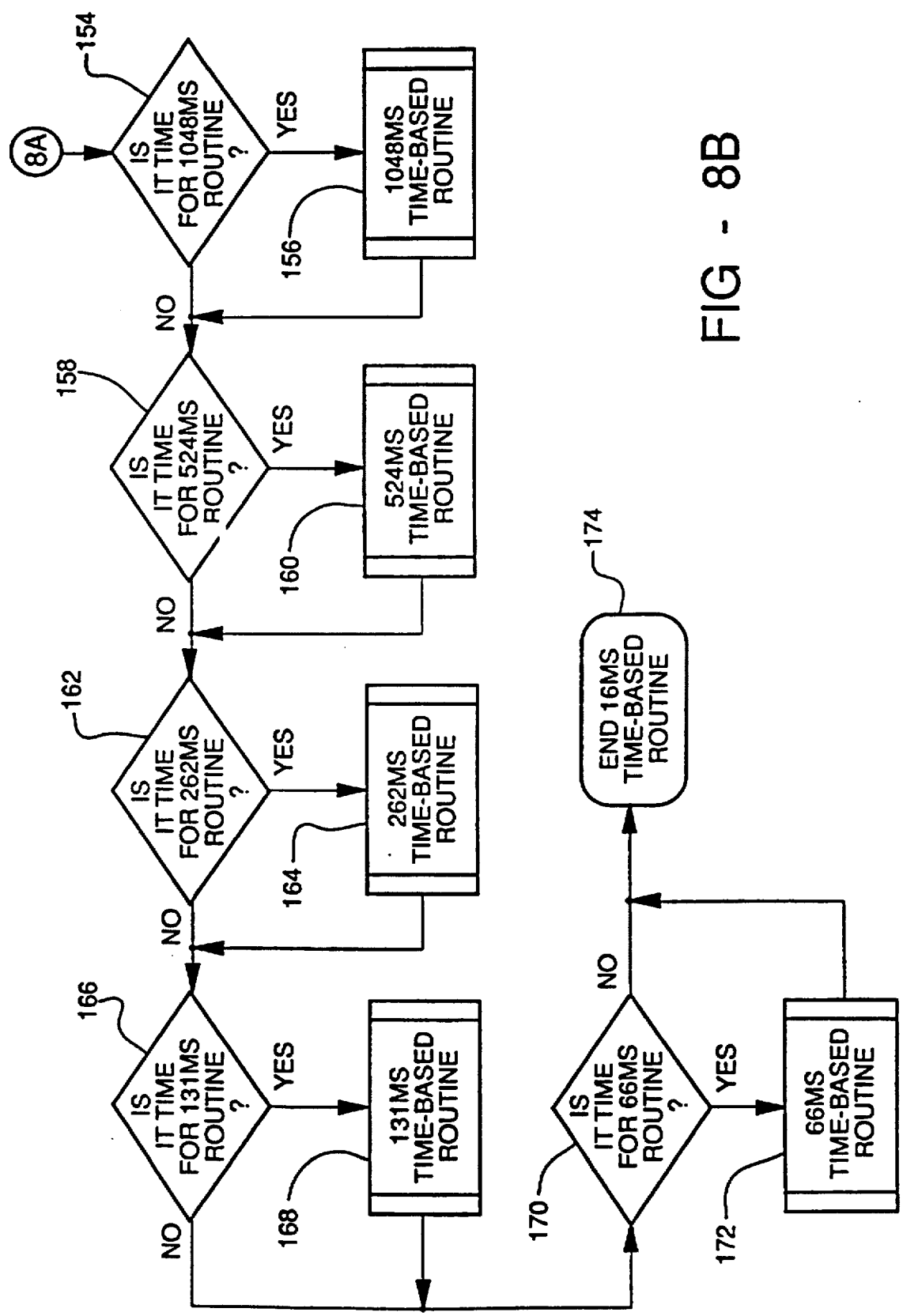

The 16 ms time based routine which is executed at step 90 of the main loop shown in FIG. 5 is set forth in detail in FIGS. 8A and 8B. Starting with FIG. 8A, at step 124, a power-up delay flag process routine is executed to ensure that a minimum predetermined time has elapsed after power, such as, for example, a 500 ms delay. At step 126, the clutch calibration values are stored in EEPROM 18 of the microprocessor 12 for the modulated clutches F1, F2 and R. These values represent the current offset values needed to just begin to cause clutch engagement. Next, at step 128 the vehicle-specific turbo boost calibration values are all stored in EEPROM 18.

At step 128, the vehicle-specific boost calibration constant (i.e., boost offset value) determined as explained in connection with FIG. 3 is stored in EEPROM 18 of the microprocessor 12. At step 130, an EEPROM service subroutine is executed to ensure that any values which need to be written to or read from the EEPROM 18 are valid.

With continued reference to FIG. 8A, at step 132 an optional calibration offset value for each of the modulated clutches F1, F2 and R will be added to the clutch calibration value stored at step 126. Step 132 represents an optional feature by which additional clutch calibration information in the form of an offset value can be added, for example, by trained service technicians, to further modify the shift characteristics of any one of the directional clutches.

With continued reference to FIG. 8A, at step 134 an "on-off hold timer" is incremented which essentially keeps track of how long the coils of the solenoid valves associated with each of the on/off clutches of the transmission are being held at 12 volts. It will be appreciated that the on/off solenoid valves each include six volt coils. However, a 12 volt DC signal is applied to each coil when it is turned on to drive the solenoid very quickly into its on position. The on/off hold timer at step 134 keeps track of how long a particular solenoid is being held at +12 volts DC. This timer is also cleared when a +12 volt DC signal is first applied to any on/off solenoid valve. The timer is incremented approximately every 16.3 ms.

Referring to step 136, a shift lever control process routine is executed which reads the switches associated with the gearshift lever 36 which indicate the position of the lever 36. This routine is explained in greater detail in U.S. Pat. No. 5,388,476. It will be appreciated, however, that the routine explained in detail therein is not essential to proper operation of the present invention but is preferably included at this point in the 16 ms time based routine 90.

With continued reference to FIG. 8A, at step 138 an engine speed compensation calculation routine is executed which modifies the duty cycle of the modulated clutches F1 and F2 based on the engine speed. This compensates for the lower hydraulic pump pressure which is generated at lower engine speeds. At step 140, an analog filtering routine is executed which filters analog voltages from the turbo boost sensor 20, the inching clutch pedal sensor 26 voltage, the feedback voltages obtained from any diagnostic sensors, and the system voltage.

At step 142 a fault control routine is executed for handling other faults that are not related to the output drivers for the solenoid valves. For example, this routine checks to ensure that the inching clutch pedal sensor 26 is not shorted to ground, that the turbo boost sensor is not shorted to ground, or that the output shaft speed sensor 41 is not malfunctioning.

With continued reference to FIG. 8A, a switch transition mode control routine is executed, as indicated at step 144, to ensure that the voltage signal from the top-of-clutch switch 27a is within acceptable limits, that if a signal from bottom-of-clutch switch 27b is being generated that the bottom-of-clutch signal is within acceptable voltage limits, and that the inching pedal potentiometer 26 (FIG. 1) is operating within valid voltage limits.

At step 146, a frequency input overflow routine is executed to set the input shaft or output shaft speeds to zero when no pulses are received by the VRMP sensor associated with each of the input and output sensors 22 and 41, respectively, and when the frequency of the pulses from each sensor falls below a predetermined lower limit. At step 148, a turbo boost process routine is executed. This routine is described in greater detail with the flow chart of FIG. 9, but essentially involves scaling the turbo boost value provided by the turbo boost sensor 20 in relation to the engine rpm to compensate for the drop in turbo boost pressure that occurs when the engine is operated at high loads which cause the engine to lug down. Alternately, a routine as described in greater detail with the flow chart of FIG. 9A may be employed which directly computes an engine load value from the turbo boost signal and the engine speed signal.

Referring to step 150, an inching pedal process routine is executed to determine the duty cycle that needs to be applied to the directional clutch F1 or F2 being engaged via the clutch pedal by the operator to produce the appropriate clutch pressure based on the current pedal position. Thus, this routine determines the proper duty cycle which corresponds to the clutch pedal position at a given instant. At step 152, a shorted output diagnostic routine is executed. This routine involves sampling the voltages of energized solenoid coils every 5 ms. With every 16 ms period there will be then at least three samples taken from which it will be determined if a coil which is energized is actually shorted. If any coil is shorted, its voltage will fall below a predetermined lower limit. A diagnostic fault indication can then be provided to a display panel of the vehicle to provide an operator that a fault condition has arisen.

Referring to step 154 as shown in FIG. 8B, every 1048.576 ms, the software processes certain information and performs certain fault condition checks, to be explained momentarily. Thus, at step 154, a check is made to determine if 1049 ms has elapsed. If so, a 1048 ms time based routine is executed. This routine processes an audio alarm signal which is present for about three seconds during the turbo boost calibration mode. This alarm is generated in response to an operator pressing appropriate switches on the display/keyboard 29 for a period greater than three seconds while the tractor is on a smooth level surface with its throttle at high idle and the shift lever 36 in neutral. The A/D reading of the thermistor (resistor 30 shown in FIG. 1) indicating the temperature of the modulated solenoid coil is also processed and the sensed temperature is updated. The turbo boost sensor 20 reading is checked for fault conditions as is the input shaft speed sensor 22. The inching clutch pedal position sensor 26 is checked, and if needed the minimum and maximum calibration values are updated.

Once the 1048 ms time based routine is executed at step 156, or the test at step 154 proves false, then a check is made to determine if at least 524 ms has elapsed, as indicated at step 158. If so, a 524 ms time based routine is executed, as indicated at step 160. With this routine, every 524.288 ms the system voltage reading is checked for over-voltage or under-voltage conditions. The engine speed is processed to determine the proper engine speed compensation value to apply when scaling the turbo boost value.

After the routine at step 160 is executed or the test at step 158 proves false, then a check is made to determine if at least 262 ms has elapsed, as indicated at step 162. If so, a 262 ms time based routine is executed. With this routine, every 262.144 ms the shorted fault lamp diagnostics, the open solenoid coil diagnostics and the driver/solenoid feedback circuit fault diagnostics are executed. The display switch input debounce routine is executed and, 10 if any display switches have changed and have been debounced, the corresponding switch transition is processed. Finally, the clutch overload diagnostics are performed. These diagnostics are merely checks of the input shaft speed of the transmission against the output shaft speed to determine if excessive clutch slippage is present, based on known input shaft speeds and gear ratios being used.

If the test at step 162 proves false or the routine at step 164 is executed, a check is made to determine if at least 131 ms has elapsed, as indicated at step 166. If so a 131 ms time based routine is executed, as indicated at step 168. With this routine, every 131.072 ms, the serial data stream containing the display switch information is received from the display. Every other loop the updated display information is sent to the display. The shift lever switch drop-out diagnostics and shorted output driver diagnostics are performed. The status of a park-lock bulb is updated as is the status of the audio alarm. The engine speed and vehicle acceleration values are calculated and the maximum duty cycles to apply to the solenoids are calculated based on the filtered system voltage readings. The calculated engine speed and vehicle acceleration values are used during shuttle-shifting by the microprocessor 12 to help select the appropriate gear, based on engine speed acceleration and vehicle speed acceleration, to shift into which is closest to the gear selected by the operator.

If the routine at step 168 has been performed or the test at step 166 proves false, then a check is made to determine if 66ms has elapsed, as indicated at step 170. If this test proves true, then a 66 ms time based routine is executed as indicated at step 172. With this routine, every 65.536 ms the inching pedal diagnostics are executed together with the input and output shaft speed sensor diagnostics. Once this routine has been concluded, or the test at step 170 proves false, the 16 ms time based routine ends, as indicated at step 174.

Figure 9:
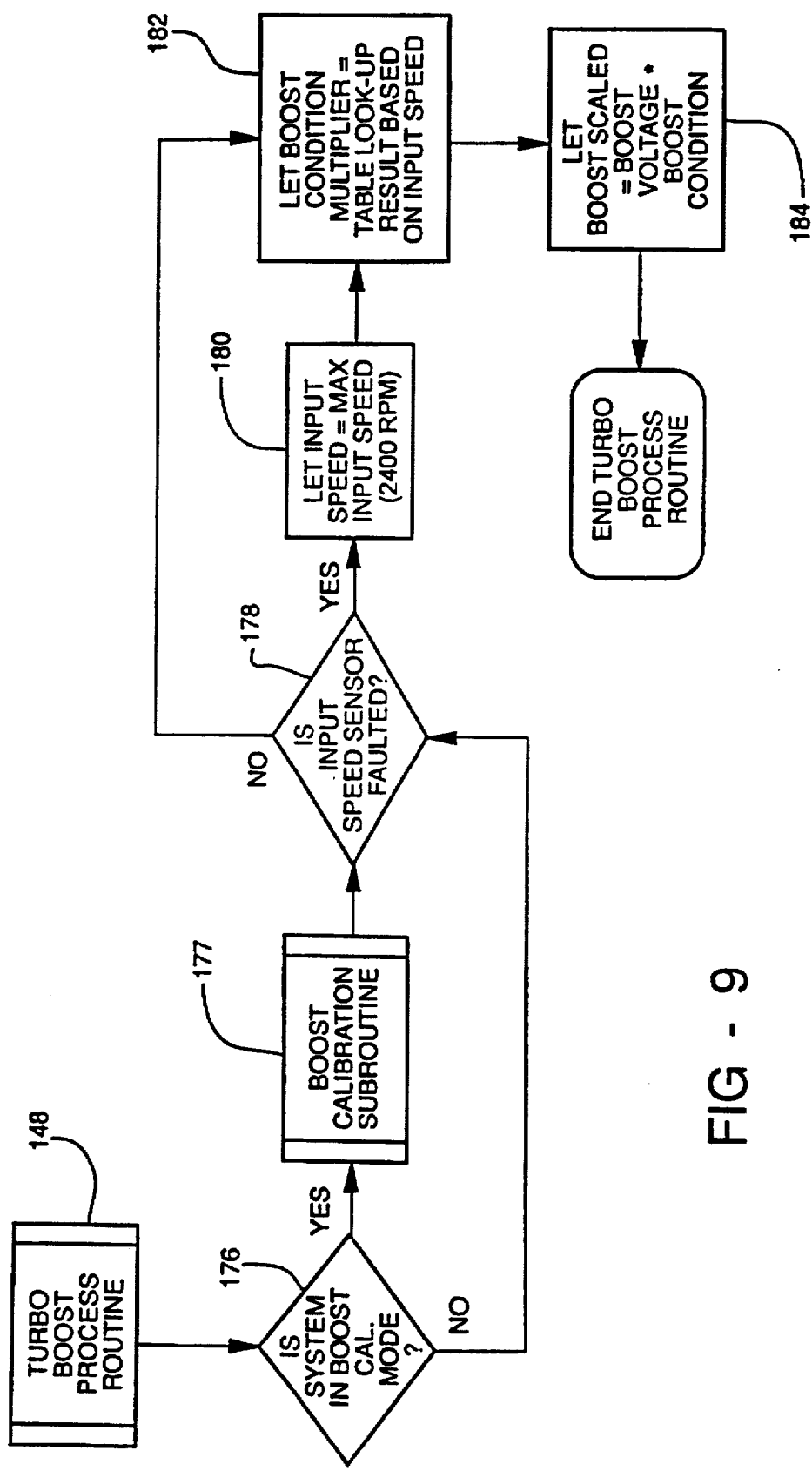
FIG. 9 is a flow chart of the turbo boost process routine for determining a conditioned or compensated turbo boost value which takes into account the engine speed of the vehicle.

Referring now to FIG. 9, the turbo boost process routine executed at step 148 in FIG. 8 is shown in greater detail. Initially, the software determines if the system is in the boost calibration mode, as indicated at step 176. The boost calibration mode is preferably initiated via a display mounted control. If the calibration mode has been selected by the operator or a service technician, then the boost calibration subroutine (routine 55 of FIG. 3) is executed, as indicated at step 177.

With further reference to FIG. 9, a check is next made to determine if the engine speed sensor 22 (FIG. 1) is faulted, as indicated at step 178. If so, the input shaft speed of the transmission is assumed to be at a maximum input shaft speed of, for example, about 2400 rpm, as indicated at step 180. It will be appreciated that this maximum input shaft speed value may vary depending upon the engine and/or the vehicle being used.

Next, the sensed turbo boost value, which now represents a "normalized" value after being modified by the vehicle specific calibration constant, is further modified by multiplying it by an appropriate one of a plurality of engine speed constants. The engine speed constants are stored in a look-up table, as indicated at step 182, and compensate for situations where the engine has begun to "lug down", thus causing the turbo boost pressure value sensed by the sensor 20 (FIG. 1) to drop. As explained briefly herein, the boost signal sensed by the sensor 20 increases, it is assumed linearly, as engine rpm increases. However, when the load on the vehicle becomes so great such that the engine begins to lug down, the dropping engine rpm will cause a reduction in the boost pressure generated by the engine's turbocharger. If this situation were not compensated for, the microprocessor 12 would determine, erroneously, that the load is dropping when in fact the load is actually increasing on the vehicle. Thus, the microprocessor 12 would determine that the vehicle is more lightly loaded and cause the improper duty cycle to be used for the PWM drive signal used to modulate the appropriate clutch into engagement. By multiplying the normalized boost value by the appropriate engine speed constant, the drop in turbo boost pressure that occurs as the engine begins to lug down is compensated for. In FIG. 10, it can be seen that the multiplier for the turbo boost value below 2100 rpm increases as the engine rpm decreases. In this example, 2100 rpm represents the engine speed at which the engine produces its peak torque under full-load. As the engine begins to lug down due to an external load on the vehicle, the value of the boost multiplier increases. With reference again to FIG. 9, at step 184 the normalized boost pressure value is multiplied by the engine speed constant to achieve a "conditioned" or "compensated" turbo boost value.

The above-described method of estimating the engine load gives consistent results when the engine is operating at or near full-throttle condition. In typical agriculture applications, this accounts for a majority of the engine operating conditions. However, inaccuracies arise in the engine load approximation when the engine is operating in a part-throttle condition. These inaccuracies are thought to be attributable to the non-linearly changing slope of the turbo boost pressure during part-throttle conditions. An alternate preferred method of estimating the engine load based on turbo boost pressure and engine speed is illustrated in FIG. 9A which can account for varying characteristics of the turbo boost pressure over the entire range of engine operating speeds.

Figure 9A:
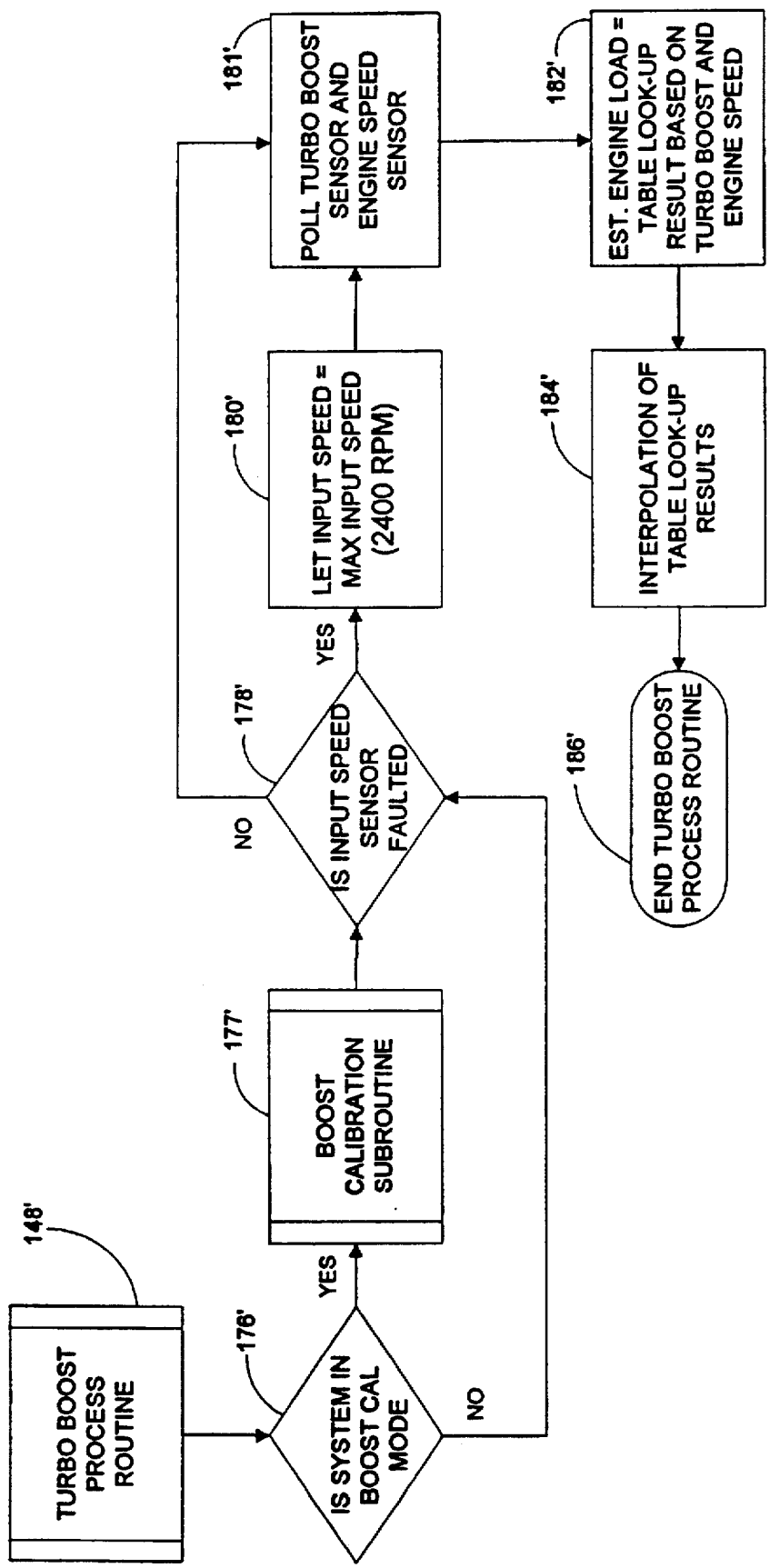
FIG. 9A is a flow chart of the turbo boost routine for determining an engine load value as a function of the normalized turbo boost signal and the engine speed signal.

Referring now to FIG. 9A, an alternate preferred method of estimating engine load as a function of turbo boost pressure and engine speed will be described. Aspects of this alternate method which are similar or identical to those previously described with respect to FIG. 9 are given similar reference numbers, a primed number indicating the alternate method. Thus, turbo boost process routine executed at step 148 in FIG. 8 is substituted with turbo boost process routine 148' as shown and described in greater detail.

As illustrated in FIG. 9A, if initiated, the boost calibration steps 176' and 177' are performed, yielding a vehicle-specific calibration constant. Likewise, a check is made at step 178' to determine whether speed sensor 22 is functioning properly. If sensor 22 is not functioning properly, a maximum input speed of 2400 rpm is subsequently used as a default value.

During the operation of the vehicle, the input speed sensor 22 and the turbo boost pressure sensor 20 are polled at step 181' and an engine speed signal and a raw turbo boost signal are generated within electronic controller 12. The raw turbo boost signal is modified by the calibration constant to yield a normalized turbo boost signal, as heretofore described. Controller 12 then calculates an estimated engine load as a first-order, linear function of the engine speed signal and the normalized turbo boost signal, hereinafter referred to as the engine load value. The form of this estimation is set forth below equation (1).

$$\tau = (A_1 x + A_0)(B_1 y + B_0) \tag{1}$$

where $\tau$ is the estimated engine load or engine load value;

x is the turbo boost value;

y is the engine speed; and $A_1, A_0, B_1, B_0$ are constants.

One method of performing this calculation is to execute a tabular data look-up operation and data interpolation as illustrated in steps 182' and 184'.

At this point, the engine load value represents a more exact approximation of the engine torque than the conditioned turbo boost value or BOOST SCALED represented at step 184 of FIG. 9, in that the variations in turbo boost pressure resulting from part throttle conditions are more accurately computed. Turbo boost process routine 148' is completed at step 186' and the engine load value is used in a manner identical to the conditioned or compensated turbo boost value computed in the first preferred method previously described in conjunction with FIG. 9. Thus, one of ordinary skill in the art would readily recognize that the engine load value can be readily substituted for the conditioned or compensated turbo boost value in the methods hereinafter described.

With reference again to FIG. 9A, the details of the data table look-up function and interpolation of steps 182' and 184' will be described in further detail. As previously mentioned, it has been found that the engine load for a given operating condition can be more accurately approximated as a function of both the engine speed and the turbo boost pressure. One method of computing this interrelationship is to construct a three-dimensional torque map representing the turbo boost pressure on the x-axis, the engine speed on the y-axis and the PTO torque on the z-axis. An exemplary 3-D torque map is shown at 182a' in FIG. 10A. Thus, the generation of an accurate torque map is an important aspect for achieving consistent shifts over the range of engine load and throttle conditions utilizing the present invention.

A presently preferred method of generating a torque map is to collect experimental data from a vehicle engine coupled to a dynamometer via the PTO shaft. A throttle condition is set with no load on the engine to determine the starting point for the data acquisition. Subsequently, the engine is loaded with dynamometer until the engine speed decreases by 50 rpm. At this point the boost pressure and PTO torque data are recorded. The engine is then further loaded until the engine speed decreases an additional 50 rpm. This process is repeated over an engine speed range of 2400–1600 rpm for a given throttle setting which results in a series of data points where the engine load is known for a given engine speed and turbo boost pressure. Similar tests are run for a variety of throttle conditions from closed throttle to wide-open throttle.

Figure 10A:
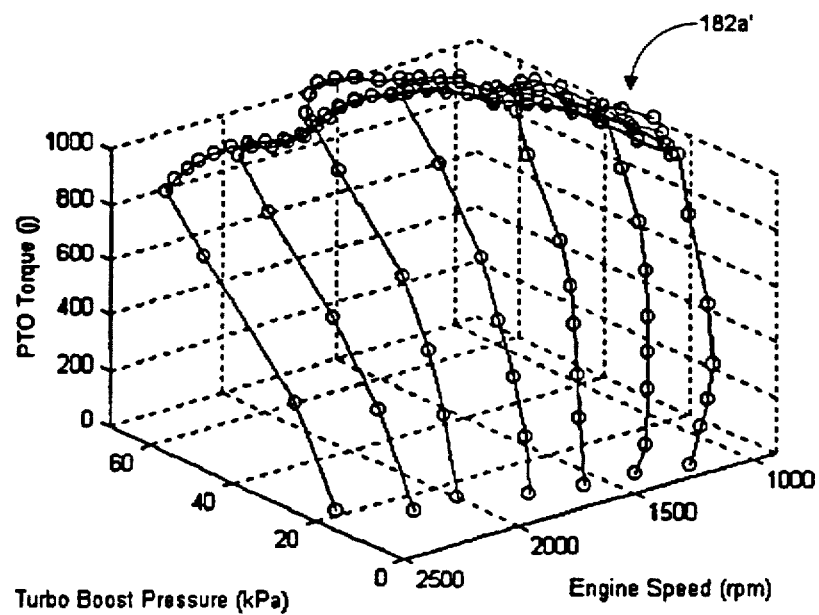
FIG. 10A is a representative 3-D torque map illustrating a sparsely populated data set consisting of the raw empirical data obtained from an engine dynamometer test stand developed according to the methods of the present invention.

The above described method for obtaining experimental data yields a sparsely populated torque map 182a' as shown in FIG. 10A. Sparsely populated torque map 182a' has approximately 80 data points with only approximately 4 data points for a given engine rpm in the area where the slope of the engine torque is rapidly changing. i.e. rise-to-peak torque area. Thus, it is presently preferred to fill in missing portions of the 3-D torque map using a first-order linear interpolation technique. More specifically, a least squares regression of four adjacent data points, as set forth below in equation (2), is preferably used to approximate intermediate points within the region defined by those four data points. This step is repeated for each unique set of four adjacent data points to yield a more fully populated torque map having approximately 744 data points.

$$\begin{bmatrix} \tau_1 \\ \tau_2 \\ \tau_3 \\ \tau_4 \end{bmatrix} = \begin{bmatrix} x_1 y_1 & x_1 & y_1 & 1 \\ x_2 y_2 & x_2 & y_2 & 1 \\ x_3 y_3 & x_3 & y_3 & 1 \\ x_4 y_4 & x_4 & y_4 & 1 \end{bmatrix} \begin{bmatrix} A_1 B_1 \\ A_1 B_0 \\ A_0 B_1 \\ A_0 B_0 \end{bmatrix} \quad (2)$$

Figure 10B:
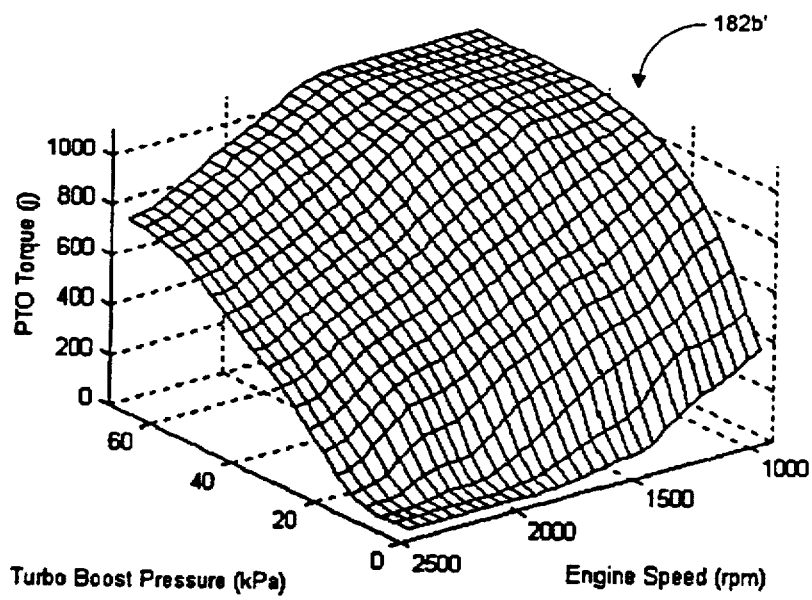
FIG. 10B is a representative 3-D torque map illustrating a more fully populated data set developed according to the methods of the present invention in which the raw empirical data has been interpolated and smoothed into a form that the controller can use this data to determine the engine load value from the turbo boost pressure and the engine speed.

One consequence of filling in missing portions of the torque map with a linear approximation is the creation of anomalies or lack of continuities along the seams of the interpolated data regions. Thus, it is presently preferred to utilize a smoothing function along the seams to eliminate these anomalies. For example, a three-point moving average can be performed on the data wherein a filtered value is computed by averaging three adjacent data points which have been multiplied by an appropriate weighting function. This smoothing function is first performed along the y-axis (engine speed axis) while holding the x values (turbo boost values) constant, and then is performed along the x-axis (turbo boost axis) while holding the y values (engine speed values) constant. A representative torque map 182b' generated using the above described methodology is depicted in FIG. 10B. This data, which is shown in graphical form in FIG. 10B, and is represented by the points at interstices of x and y lines in FIG. 10B is preferably incorporated into step 182' to estimate engine load value.

As previously described, the engine load value is computed using the engine speed signal and the turbo boost signal immediately proceeding the execution of a shift. While the above-described method provides a more fully populated torque map, the data is still discrete. Thus, it is presently preferred to further utilize a linear interpolation step, as illustrated at step 184', to compute the engine load value when the engine speed and turbo boost values do not exactly correspond with the data located in memory. Furthermore, interpolation step 184' enables the more fully populated 3-D torque map to be implemented without requiring a large amount of memory in controller 12 for data storage by reducing the amount of data stored in memory to discrete engine speeds. For example, the data table may include data for engine speeds of 2400, 2200, 2000, 1800, and 1600 rpm represented by approximately 155 data points with 30–40 data points in the rise-to-peak torque area for a given engine rpm.

The interpolation routine illustrated at step 184' would be performed as follows for an engine operating at 40 kPa turbo boost value and 2300 rpm. Controller 12 returns an engine load value from the table look-up function for 40 turbo boost value/2200 rpm and 40 turbo boost value/2400 rpm, and then calculates the weighted average to estimate the engine load value for 40 kPa/2300 rpm. If the engine is operating outside of the data table range (i.e., less than 1600 rpm or greater than 2400 rpm), the boundary value from the torque map is used to estimate the engine load value.

While the turbo boost process routine as illustrated in FIG. 9A has been described with particular reference to utilizing 3-D torque mapping data techniques in conjunction with table look-up and interpolation functions, one skilled in the art should recognize that any method which estimates the engine load as a function of the engine speed and the turbo boost pressure could be utilized. For example, higher (second or greater) order, non-linear curve fitting techniques could be employed to provide a mathematical function for the data, thus eliminating the need to perform the various interpolation routines heretofore described.

Figure 11A:
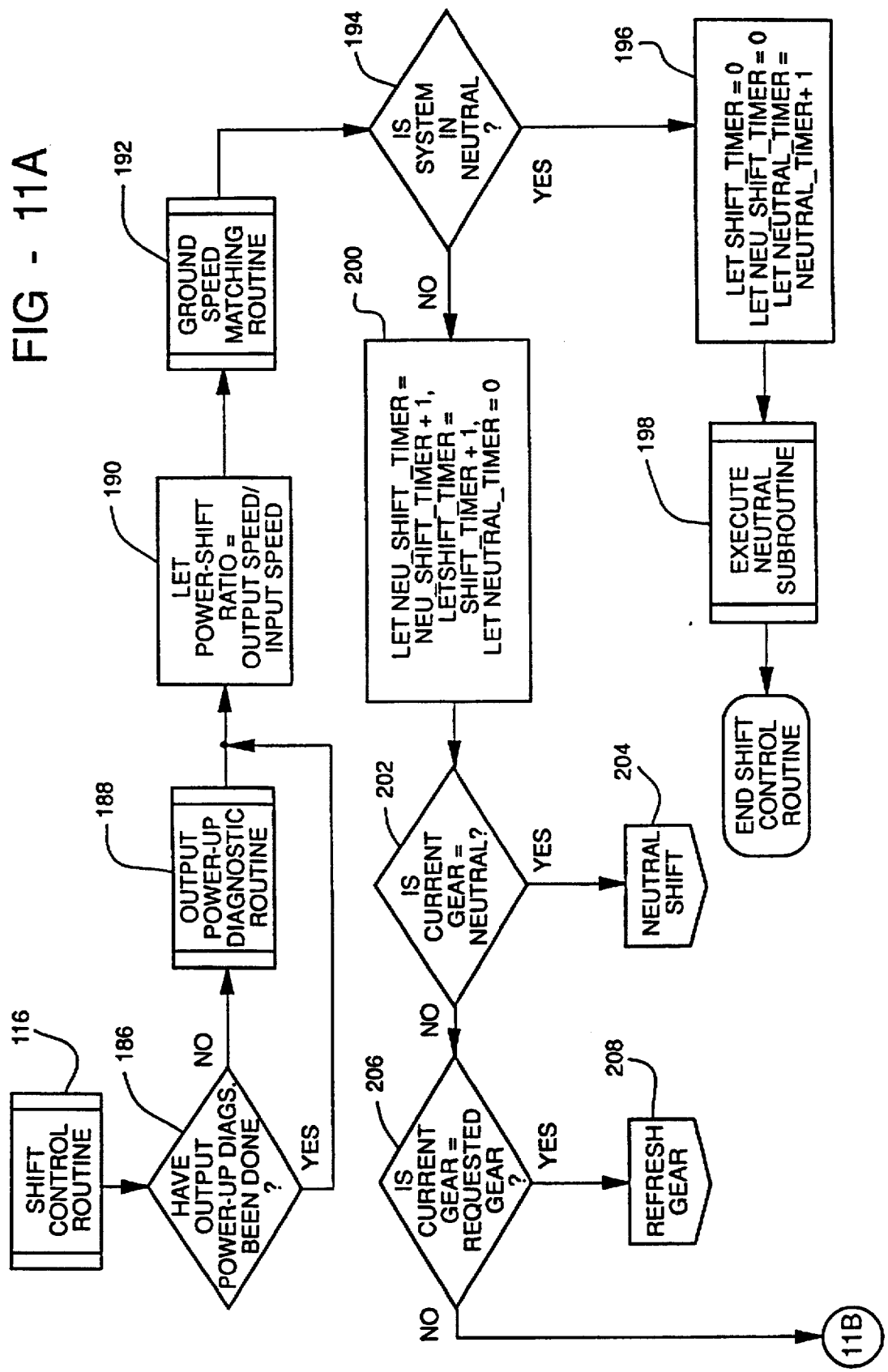
FIGS. 11A and 11B are a flow chart of the steps performed in the shift control routine of the present invention.
Figure 11B:
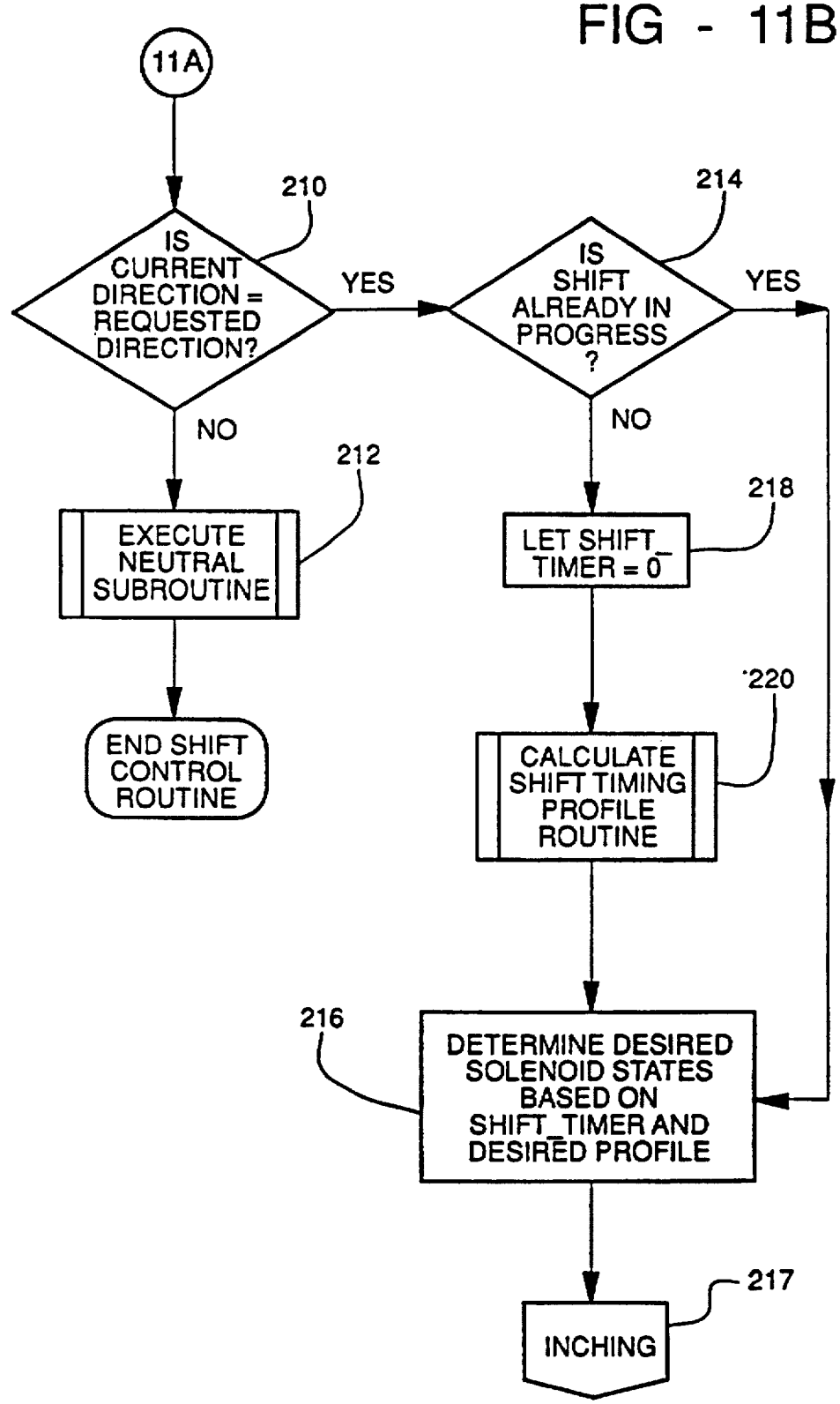

Referring now to FIGS. 11A and 11B, the shift control routine denoted at step 116 in FIG. 7 is described in greater detail. Referring first to step 186 in FIG. 11A, a check is made to determine if the output power-up diagnostics have been performed. These diagnostics involve having the microprocessor 12 briefly turn on each solenoid valve, one at a time, to ensure that there are no shorted control lines going to the coils of each of the solenoid valves. It will be noted that energizing one solenoid valve at a time with the Funk 9400 series transmission will not cause any shifting to occur.

At step 188, the solenoids are actually turned on, one at a time, with appropriate drive signals from the microprocessor 12, if the output power-up diagnostics have not previously been performed. With continuing reference to FIG. 11A, at step 190 the powershift ratio is determined by dividing the sensed output shaft speed by the sensed input shaft speed. At step 192 a ground speed matching routine is executed to prevent damage to the directional clutches by automatically requesting an appropriate gear ratio for the sensed input and output shaft speeds. For example, when the operator has depressed the clutch or shifted out of a gear, e.g. gear 18F, and into neutral to prepare for an approaching stop sign, the controller 12 will incrementally and sequentially request a downshift of the transmission to a gear ratio which matches the sensed input and output shaft speeds. Thus, if a "rolling" stop is made, a request is made to automatically downshift to a gear which matches the speed of the "rolling" stop, gear 13F for instance. If, on the other hand, a complete stop is made, a request is made to automatically downshift to gear 11F.

Referring to step 194, a check is next made to determine if the transmission is in neutral. This is accomplished by determining if either the operator has the clutch pedal 26 depressed completely such that the bottom-of-clutch pedal sensor 27b is indicating same or the shift lever 36 of the transmission 23 has been placed in neutral, as detected by the neutral detection switch 28. If the transmission is detected to be in neutral, a shift timer is set to zero, a neutral shift timer is set to zero and a neutral timer is incremented, all as indicated at step 196. Subsequently, a neutral subroutine is executed, as indicated at step 198, to place the transmission 23 in neutral.

With further reference to FIG. 11A, if the transmission 23 is not detected to be in neutral, as checked at step 194, the neutral shift timer is incremented by one, the shift timer is also incremented by one and the neutral timer is set to zero, as indicated at step 200. This step essentially keeps track of how long the shift lever 36 has been out of the neutral position. At step 202, a check is made to determine if the current gear is neutral and, if so, a neutral shift is executed as indicated at step 204. If the current gear is not set to neutral, a check is made to determine if the current gear is equal to the gear requested, as indicated at step 206. Put differently, this checks to determine if the position of the shift lever 36 is still indicating the same gear ratio that the transmission is presently in. If this test proves true, then the system checks to ensure that the solenoids that should be on to maintain the transmission in the desired gear ratio are in fact on, and that the solenoids that should be off are in fact off, as indicated at step 208.

With continuing reference to FIG. 11A, if the test at step 206 is determined to be false, then a check is made to determine if the shift that has been commanded by the operator is either from one forward gear to another forward gear or from one reverse gear to another reverse gear, as indicated at step 210. If this test proves false, then it is determined that a shift into neutral has been commanded and the neutral shift subroutine is executed, as indicated at step 212. It will be appreciated that this is the same neutral shift subroutine that would have been commanded at step 198 had it been determined at step 194 that the transmission was in neutral.

If the test at step 210 indicates that either a shift from one forward gear to another has been commanded or a shift from one reverse gear to another reverse gear has been commanded, a check is made to determine if the commanded shift is already in progress, as indicated at step 214. If so, the microprocessor 12 determines the appropriate PWM duty cycles and solenoid actuation patterns based on how far the controller is into executing the shift, as all indicated at step 216. Subsequently, at step 217 the inching clutch pedal sensor 26 is checked by the microprocessor 12 and if this pedal is being engaged by the operator the microprocessor 12 uses the signal generated by the sensor 26 to override the PWM drive signal which would normally be applied to modulate the involved directional clutch into engagement to complete the shift. Thus, the operator is always afforded the capability of overriding the modulation signal that would be applied to the involved directional clutch if a condition exists where an even slower or more rapid clutch engagement is desired than what would otherwise be commanded by the microprocessor 12.

Referring again to step 214, if it is determined that no shift is already in progress, then the shift timer is set equal to zero, as indicated at step 218, and the appropriate PWM drive signal is determined based on the compensated turbo boost value, as indicated at step 220 which is referred to as the calculated shift timing profile routine.

TURBO BOOST PRESSURE SCALING

Figure 12:
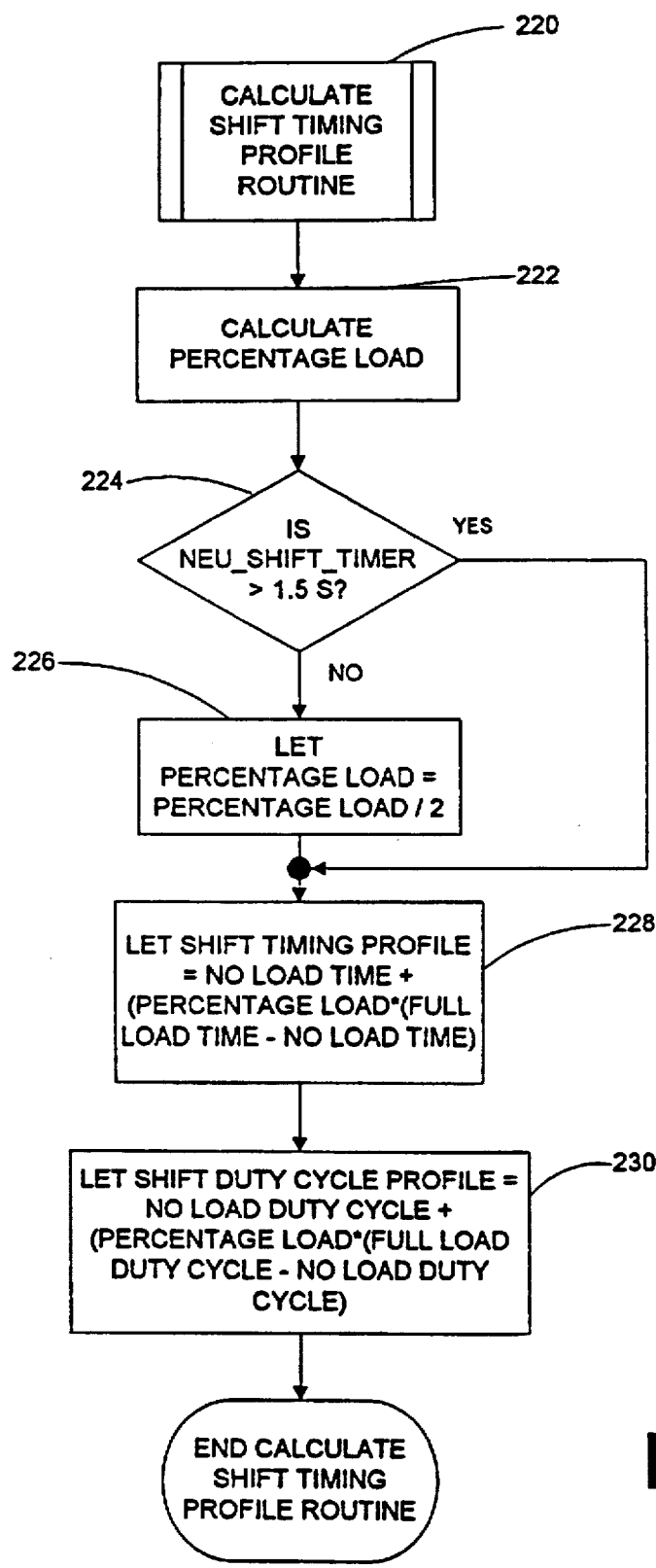
FIG. 12 is a flow chart showing the steps performed in the shift timing profile routine which is used to determine the appropriate PWM duty cycle and time interval for the percentage of full-load being experienced by the engine when making a shift involving directional clutches F1 or F2.

Referring now to FIG. 12, the turbo boost shift timing profile routine executed at step 220 in FIG. 11 is shown in greater detail. The turbo boost timing profile is, in part, based on the percent of full load or percentage load at which the engine is operating as computed at step 222. When turbo boost process routine 148 is used to estimate the engine load, the percentage load is computed in accordance with the equation (3) below as the difference between the conditioned turbo boost value ($T_{cond}$) and the normalized turbo boost value at no-load ($T_{no-load}$) divided by the difference between the normalized turbo boost value at full-load ($T_{full-load}$) and the normalized turbo boost value at no-load ($T_{no-load}$).

$$\text{Percentage Load} = \frac{T_{cond} - T_{no-load}}{T_{full-load} - T_{no-load}} \quad (3)$$

When turbo boost process routine 148' is used to estimate the engine load, the percentage load is computed in accordance with the equation (4) below as the ratio of the engine load value and the maximum engine torque.

$$\text{Percentage Load} = \frac{\tau}{\tau_{full-load}} \quad (4)$$

Alternately, the data tables from which the estimated engine load is computed may be scaled to directly provide an estimated percentage load rather than an estimate engine load. Thus, the microprocessor 12 can determine what percent of full-load the engine is experiencing when a shift is requested.

With further reference to FIG. 12, at step 224 a check is made to determine if the neutral shift timer value is greater than about 1.5 seconds. By this check the microprocessor 12 determines that the transmission has been in neutral for at least a predetermined time. If this test proves true then it is determined that the transmission has not just been shifted out of neutral and that any load being experienced by the engine is due to static drawbar load (i.e., not dynamic load). If this test proves false then it is assumed that the vehicle is accelerating from a stand still and that the load being experienced by the engine is simply that load which is experienced in simply getting the vehicle up to the desired speed. In this instance, as indicated at step 226, the controller 12 will use a modified percentage load which is one-half of the percentage load calculated at step 222.

With further reference to FIG. 12, at step 228 the desired time value in which the shift is to be completed is determined based on either the percentage load calculated at step 222 or the modified value determined at step 226. This is accomplished by the following equation (5):

$$\text{Shift Timing Profile} = t_{no-load} + \text{percentage load}*(t_{full-load} - t_{no-load}) \quad (5)$$

where $t_{no-load}$ is the no load time; and $t_{full-load}$ is the full load time.

Referring now to step 230, the appropriate duty cycle for the PWM drive signal is determined. This determination is made in accordance with the following equation (6):

$$\text{Duty Cycle} = D/C_{no-load} + \text{percentage load}*(D/C_{full-load} - D/C_{no-load}) \quad (6)$$

where $D/C_{no-load}$ is the no load duty cycle; and $D/C_{full-load}$ is the full load duty cycle.

The calculation at step 230 determines what duty cycle is required to bring the on-coming directional clutch into complete engagement in the time period determined at step 228. Together, steps 228 and 230 determine the appropriate percentage of the full-load pressure and full-load time values that need to be used to generate the PWM drive signal for modulating the on-coming directional clutch into engagement in accordance with the load being experienced by the engine, as indicated by the compensated turbo boost value or the engine load value. Thus, if the percentage load is 50% of a full-load condition, then 50% of the full-load pressure and full-load time values would be used to generate the PWM drive signal.

Figure 14:
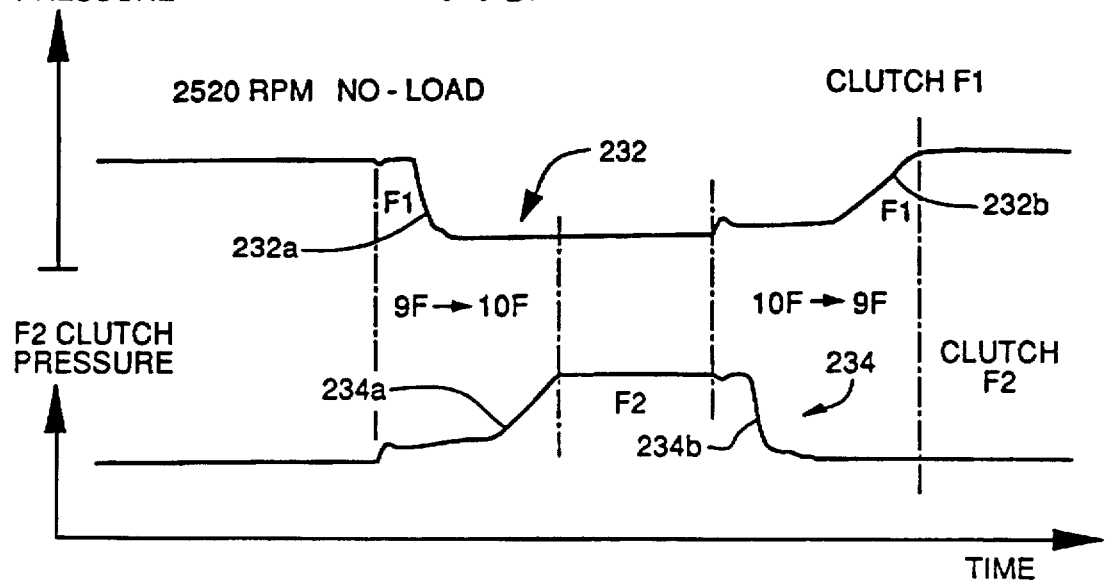
FIG. 14 is a pair of graphs of the pressure over time to the clutches F1 and F2 illustrating the rate of engagement of these clutches under a no-load condition.
Figure 15:
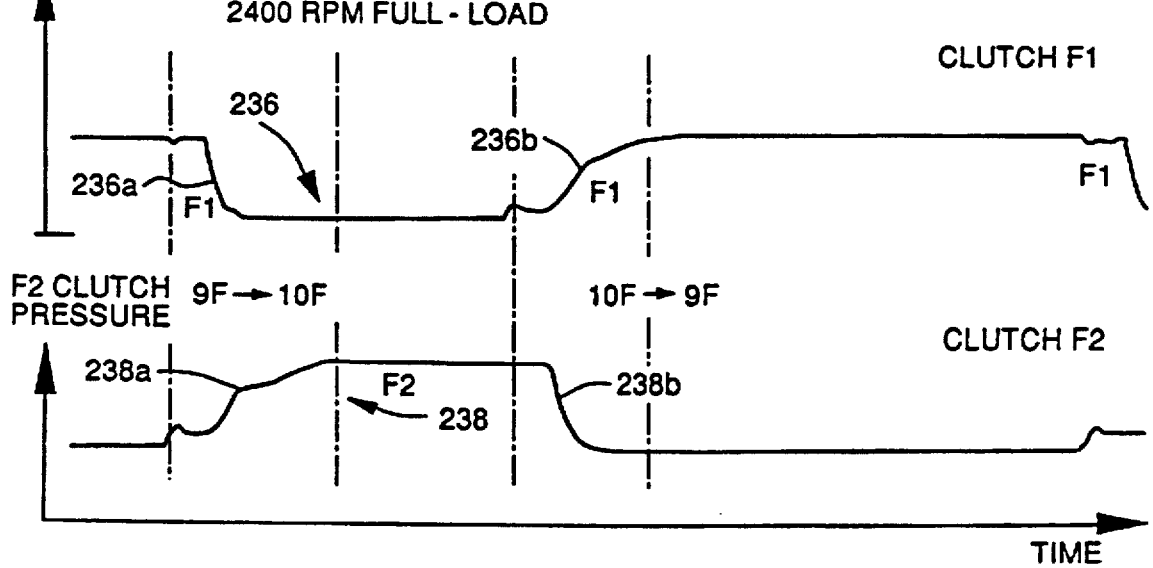
FIG. 15 is a graph of the pressure over time used to modulate the F1 and F2 directional clutches illustrating their respective rates of engagement under a full-load condition.

Referring briefly now to FIGS. 14 and 15, it can be seen from the graphs shown therein how the on-coming directional clutch is modulated more quickly into engagement at higher engine loads. Referring now specifically to FIG. 14, the top graph 232 represents the pressure to the off-going directional clutch F1 over time during a shift from gear 9F to gear 10F, as indicated by curve 232a, and a shift from gear 10F to gear 9F as indicated by curve 232b. The bottom waveform 234 indicates the pressure produced to modulate the directional clutch F2 when this clutch comes on, as indicated at waveform portion 234a during a shift from gear 9F to gear 10F. Portion 234b of this waveform indicates the rapid fall off in pressure to the off-going F2 directional clutch when a shift from gear 10F to gear 9F is made. The graphs of FIG. 14 represent the performance of the F1 and F2 directional clutches with an engine of the vehicle operating at approximately 2520 rpm under a no-load condition.

Referring now to FIG. 15, the pressure waveform for off-going directional clutch F1 is shown by waveform 236 and the pressure applied to on-coming clutch F2 is shown by waveform 238. In the graphs of FIG. 15, the engine rpm is at 2400 with the engine fully loaded. Portion 236a of waveform 236 and portion 238a of waveform 238 indicate the pressure applied to these two directional clutches during a shift from gear 9F to gear 10F.

Similarly, portion 236b of waveform 236 and portion 238b of waveform 238 indicate the pressures to the directional clutches F1 and F2 during a shift from gear 10F to gear 9F.

When comparing portion 234a of waveform 234 in FIG. 14 with portion 238a of waveform 238a in FIG. 15, it can be seen that the pressure used to modulate to the on-coming directional clutch is ramped up at a greater rate when the engine load increases and the engine rpm has decreased. This is also illustrated by comparing portion 232b of waveform 232 with portion 236b of waveform 236. In this instance clutch F1 is the on-coming directional clutch. It can be seen that clutch F1 comes on much more rapidly (i.e., at a greater rate of engagement) when the engine is loaded than when the engine is operating under no-load.

Figure 13:
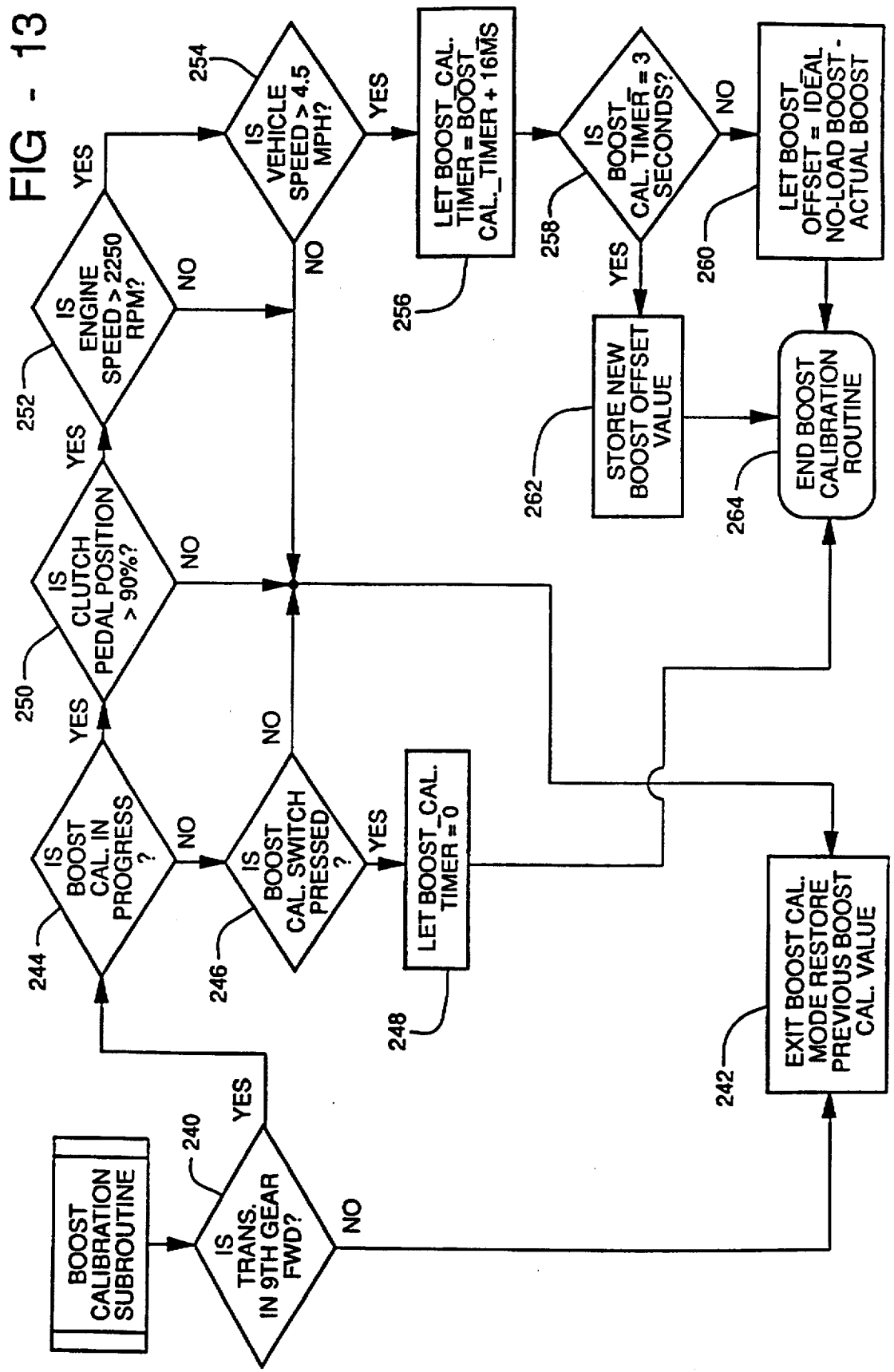
FIG. 13 is a detailed flow chart of the boost calibration subroutine described in simplified form in FIG. 3, which is used to determine a boost offset value for producing a normalized turbo boost value to compensate for vehicle to vehicle variations in turbo boost sensor readings.

Referring now to FIG. 13, the boost calibration subroutine called for at step 177 of FIG. 9, and illustrated in simplified form in FIG. 3, is described in greater detail. Initially, a check is made, as indicated at step 240, to determine if the transmission is in gear 9F. If not, the boost calibration mode is exited and the previous boost calibration value is used for subsequent determinations of the appropriate PWM duty cycle based on the previously sensed turbo boost signal, as indicated at step 242. If the test at step 240 proves true, a check is made to determine if the boost calibration is already in progress, as indicated at step 244. If this test proves false, a check is made to determine if a boost calibration switch on the display panel within the vehicle has been pressed by the operator, as indicated at step 246. If this test proves true, then a boost calibration timer is set equal to zero, as indicated at step 248, and the routine ends at step 264.

If the test at step 246 proves false (i.e., the boost calibration switch has not been pressed), then the boost calibration mode is exited at step 242. If the test at step 244 proves true, then a check is made to determine if the clutch pedal position is greater than 90% engaged, as indicated at step 250. If this test proves false then the microprocessor 12 determines that the clutch pedal is presently engaged by the operator and the boost calibration mode is exited. If the test at step 250 proves true, however, then the engine speed is checked to determine if it is greater than approximately 2250 rpm, as indicated at step 252. If this test proves false, then the microprocessor 12 determines that the engine is not operating at wide-open-throttle and again exits the boost calibration mode. If this test proves true, however, then a check is made at step 254 to determine if the vehicle speed is greater than about 4.5 mph. This test ensures that the vehicle is traveling at least a minimum predetermined speed that should be attainable under a no-load condition when in gear 9F. If this test proves false then the microprocessor 12 determines that the calibration cannot be accurately performed and exits the boost calibration mode. If the test proves true, then the boost calibration timer is incremented by a factor of 16 ms, as indicated at step 256, and a check is then made at step 258 to determine if three seconds has elapsed since the boost calibration mode has been entered. If not, a boost offset value is determined by subtracting the actual boost value determined from the baseline turbo boost value under a no-load condition, as indicated at step 260. If the test at step 258 proves true, then the last offset value determined at step 260 is stored at step 262 in the RAM 16 of the microprocessor 12. The boost calibration routine is then terminated, as indicated at step 264.

Referring now to FIGS. 16-19, the preferred methods of the present invention are also applied during upshifts and downshifts between forward gears 10F-18F. Initially, a calibration procedure is undertaken which is identical in form to that shown in FIG. 2 to determine a suitable percentage of reduction in the pressure of directional clutch F2 when upshifts or downshifts are made from one gear to another between gears 10F and 18F while the vehicle is under no-load, and a suitable percentage reduction in the pressure of clutch F2 when the vehicle is under full load during upshifts or downshifts between gears 10F-18F. Accordingly, a percentage in the reduction of the pressure applied by the F2 clutch is determined for both a no-load condition and a full-load condition, along with a suitable time value during which the pressure of the F2 clutch is brought back up so as to fully engage the F2 clutch. The presently preferred value in the reduction of pressure of the F2 clutch during upshifts and downshifts under no-load, between gears 10F-18F, is about 80 percent. Put differently, the pressure to the F2 clutch is reduced preferably by about 80 percent when making any upshift or downshift between gears 10F-18F.

Figure 16:
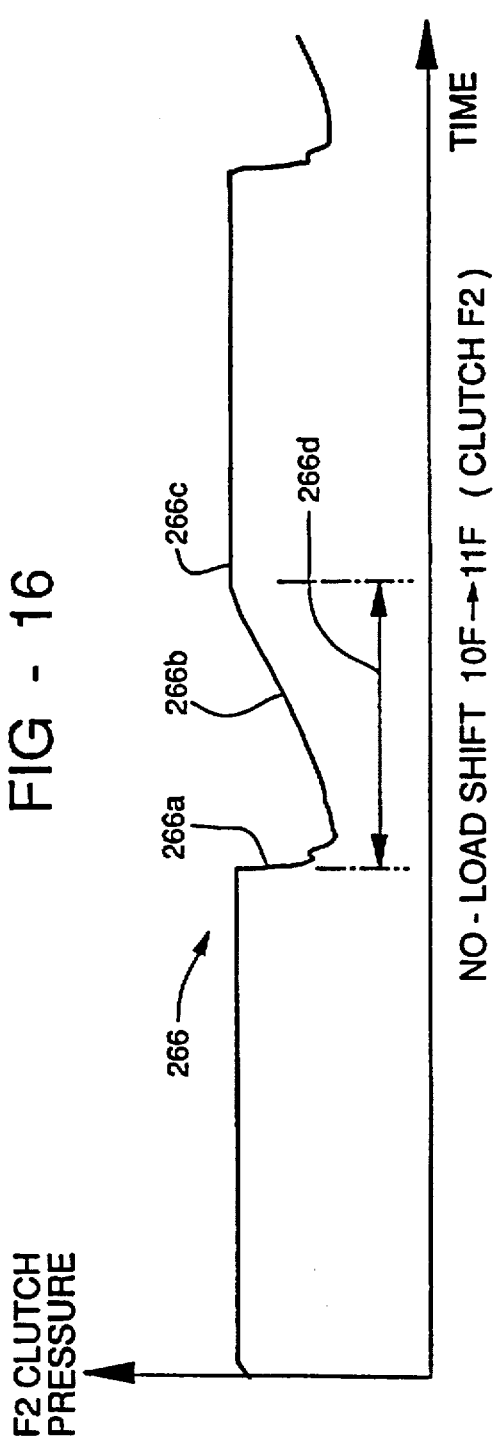
FIG. 16 is a graph of the pressure over time applied to the F2 clutch while up-shifting from gear 10F to gear 11F under a no-load condition.

With specific reference to FIG. 16, a waveform 266 illustrates the pressure of the F2 directional clutch during an upshift between gears 10F-11F. As noted by portion 266a of waveform 266, the pressure to the F2 clutch drops off very rapidly (almost instantaneously) by about 80 percent to almost completely disengage the F2 clutch during the upshift. This amount of pressure reduction is, in any event, sufficient to "break" the transmission of torque to the output shaft of the transmission. As noted by portion 266b, the pressure is then ramped up in accordance with the percentage load (the procedure of which is described in connection with FIG. 12). The percentage load determines the duty cycle for the PWM drive signal applied to the F2 clutch as well as the time interval in which to bring the F2 clutch back into full engagement. As illustrated by portion 266c of waveform 266, after the time represented by the time interval 266d, full pressure is thereafter applied by the F2 clutch. Thus, the methods described herein are not only used to control modulation of the F1 and F2 clutches during shifts between gears 9 F and 10F, but also during upshifts between gears 10F and 18F.

Figure 17:
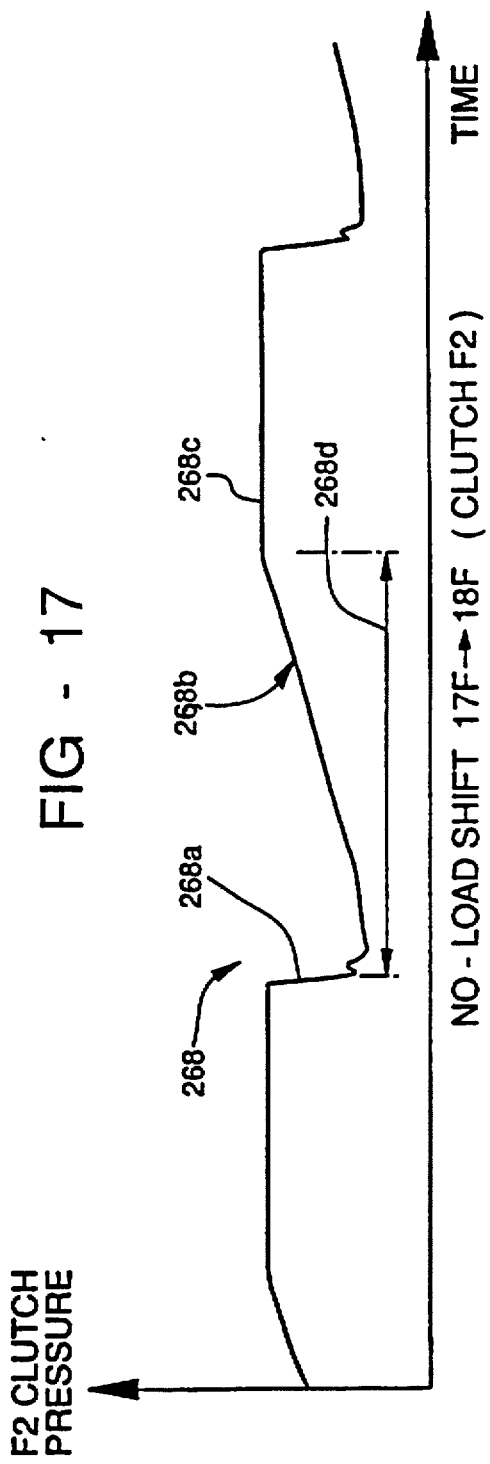
FIG. 17 is a graph of the pressure over time applied to the F2 clutch during upshifting from gear 17F to gear 18F under a no-load condition.

Referring now to FIG. 17, an upshift between gears 17F and 18F is shown. In FIG. 17 the pressure of the F2 clutch is denoted by waveform 268. Again, the pressure of the F2 clutch is reduced by about 80 percent, as indicated by portion 268a of waveform 268, to almost completely disengage the F2 clutch during the upshift. Thereafter, the pressure of the F2 clutch is ramped up, as indicated by portion 268b of the waveform 268, until full pressure is again being applied by the F2 clutch, as indicated at portion 268c of the waveform 268. It will be noted that the time duration, as denoted by time interval 268d, is longer than that for the upshift between gears 10F and 11F. This is because the sensed turbo boost pressure is higher (all other factors being the same) when the vehicle is traveling at a speed suitable to upshift from gear 17F to gear 18F than it is at which a shift from gear 10F to gear 11F takes place. Furthermore, a speed differential between a vehicle ground speed attained in gears 17F and 18F is greater than that attained in gears 10F and 11F. Thus, it is desirable to have a longer time interval between the time when the pressure of the F2 clutch is reduced by about 80 percent to the time when full pressure is again being applied. In the preferred embodiment, under no-load conditions, a time duration of about five seconds during which the pressure is ramped up to full pressure has been determined to provide very satisfactory results. By satisfactory it is meant that the shift is accomplished by modulating the F2 clutch back into full engagement at a rate, and over a time interval, which provides a relatively smooth shift, and which avoids an undesirable jolt or lurch of the vehicle. Accordingly, the pressure to the F2 clutch is ramped up much more gradually during an upshift between gears 17F and 18F than it is between gears 10F and 11F.

Referring now to FIG. 18, the pressure applied to the F2 clutch during a downshift from gear 11F to gear 10F is shown by waveform 270. It will be appreciated that the clutch pressure illustrated by waveform 270 is being applied under a no-load condition. Portion 270a denotes a reduction of about 80 percent in the pressure applied by the F2 clutch to almost immediately cause the F2 clutch to become almost completely disengaged. Portion 270b illustrates the pressure being ramped up in accordance with the PWM duty cycle and time interval determined by the percentage load until full pressure is again being applied by the F2 clutch, as indicated by portion 270c of the waveform 270. The time interval represented by period 270d reflects the total time taken to bring the pressure of the F2 clutch back up to full pressure.

Referring now to FIG. 19, the pressure to the F2 clutch is illustrated during a downshift from gear 18F to gear 17F, as graphically indicated by waveform 272, under a no-load condition. Portion 272a indicates a drop of about 80 percent in the pressure of the F2 clutch as the downshift begins. Thereafter, the pressure of the F2 clutch is ramped up, as indicated by portion 272b of the waveform 272, to bring the pressure of the F2 clutch back to full pressure, as indicated by portion 272c. The time interval indicated by portion 272d is greater than that for a downshift from gear 11F to gear 10F. Again, this is because the boost pressure produced at vehicle operating speeds during a shift between gears 18F and 17F is greater under a no-load condition than the boost pressure generated during a shift between gears 11F and 10F while under a no-load condition.

Accordingly, from the graphs of FIGS. 16–19 it can be seen that the F2 directional clutch is modulated into engagement in accordance with a suitable duty cycle and over a suitable time interval to produce a smooth shift under a no-load condition. If the upshifts of FIGS. 16 and 17 were made by operating under a full-load condition, then portions 266a and 268a of each waveform 266 and 268, respectively, would be significantly shorter and would represent a drop off in the pressure applied to the F2 clutch of only a very small degree, and preferably between about 0 percent and 10 percent. Similarly, if these shifts were made under a full-load condition, portions 266b and 268b would be steeper to cause the time interval 266d or 268d to be significantly reduced, to thus bring the F2 clutch back up to full pressure much more quickly. If the percentage load is such as to indicate a load condition at a midpoint between no-load and full-load, then the reduction and pressure illustrated by portions 266a and 268a of waveforms 266 and 268, respectively, would indicate only about a 40 percent drop in the pressure of the F2 clutch. Moreover, if under full-load, the time durations represented by portions 270b and 272b of waveforms 270 and 272, respectively, would be steeper to illustrate more rapid increase in the rate of pressure of the F2 clutch. Those of ordinary skill in the art will also appreciate that the teachings presented herein relating to the controlled modulation of the directional clutches F1 and F2 could also just as easily be applied to clutch F1 during upshifts and downshifts between gears 1F and 9F.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. In an electronic controller of a powershift transmission system for an off-road vehicle having at least one proportionally-modulatable, directional clutch coupled to an engine having a turbocharger and operating at an engine speed, a method of controlling the powershift transmission system comprising the steps of:

monitoring a turbo boost pressure developed by the turbocharger and generating a turbo boost signal therefrom;

monitoring the engine speed and generating an engine speed signal therefrom;

estimating the load being experienced by the engine as a function of the turbo boost signal and the engine speed signal and producing an engine load value;

generating a shift profile signal based on the engine load value; and communicating the shift profile signal to the directional clutch for controlling the engagement of the directional clutch to shift the powershift transmission.

2. The method of claim 1, wherein the step of determining an engine load comprises the steps of:

generating a data table representing the engine load as a function of a known engine speed and a known turbo boost pressure for a plurality of operating conditions;

comparing the turbo boost signal and the engine speed signal with the data table to determine the engine load value.

3. The method of claim 2, wherein the step of comparing the turbo boost signal and the engine speed signal further comprises linearly interpolating the engine load value from the data table, the turbo boost signal and the engine speed signal.

4. The method of claim 2, wherein the step of generating a data table comprises:

setting an operating condition for the engine, including a throttle condition, and an engine speed;

measuring measured values for the turbo boost pressure, the engine speed and the engine load to determine the known turbo boost pressure, the known engine speed and a known engine load for the operating condition; and storing the known turbo boost pressure, the known engine speed and the known engine load as a data point in the data table to create a sparsely populated data table.

5. The method of claim 4, wherein the step of generating a data table further comprises the steps of approximating approximated values intermediate the measured values from at least two data points in the data table and storing the approximated values as a data point in the data table to create a more fully populated data table.

6. The method of claim 5, wherein the step of approximating approximated values comprises the step of performing a least squares regression for each unique set of four adjacent data points.

7. The method of claim 5, wherein the step of generating a data table further comprises the step of smoothing the data points of the more fully populated data table.

8. The method of claim 5, wherein the step of generating a data table further comprises the step of selecting data points from the fully populated data table at discrete engine speeds.

9. The method of claim 1, wherein the step of generating a shift profile signal further comprises the steps of:

determining a percentage load from the engine load value; and generating a weighted shift profile signal based on the percentage load, a no-load shift profile and a full-load shift profile.

10. The method of claim 9 wherein the step of determining a percentage load comprises the steps of:

determining a full-load engine load value while the vehicle is being operated under wide-open-throttle and under a full-load condition; and comparing the engine load value with the full-load engine value to determine a percentage load.

11. The method of claim 1, further comprising the steps of:

determining a turbo boost pressure calibration constant;

modifying the turbo boost signal in accordance with the calibration constant to produce a normalized turbo boost signal; and utilizing the normalized turbo boost signal and the engine speed signal to determine the engine load value.

12. A method for shifting a powershift transmission in an off-road vehicle, the powershift transmission having at least one proportionally-modulatable, directional clutch coupled to an engine having a turbocharger and operating at an engine speed, the method comprising the steps of:

generating a data table representing a known engine load as a function of a known engine speed and a known turbo boost pressure for a plurality of operating conditions of the engine;

monitoring a turbo boost pressure developed by the turbocharger and generating a turbo boost signal therefrom;

monitoring the engine speed and generating an engine speed signal therefrom;

comparing the turbo boost signal and the engine speed signal with the data table to estimate the load being experienced by the engine and to produce an engine load value therefrom;

generating a shift profile signal based on the engine load value; and modulating the directional clutch into engagement at a desired rate of engagement based on the shift profile signal to shift the transmission.

13. The method of claim 12, wherein the step of generating a data table comprises the step of empirically determining the known engine load as a function of the known turbo boost pressure and the known engine speed.

14. The method of claim 12, wherein the step of comparing the turbo boost signal and the engine speed signal further comprises the step of linearly interpolating the engine load value from the data table, the turbo boost signal and the engine speed signal.

15. The method of claim 12, wherein the step of generating a shift profile signal further comprises the steps of:

determining a percentage load from the engine load value; and generating a weighted shift profile signal based on the percentage load, a no-load shift profile and a full-load shift profile.

16. The method of claim 15, wherein the step of determining a percentage load comprises the steps of:

determining a full-load engine load value while the vehicle is being operated under wide-open-throttle and under a full-load condition; and comparing the engine load value with the full-load engine value to determine a percentage load.

17. A method of generating a data table having a known engine load, a known engine speed and a known turbo boost pressure for a plurality of operating conditions to be used in an electronic transmission controller for shifting a powershift transmission of an off-road vehicle having at least one proportionally-modulatable, directional clutch coupled to an engine having a turbocharger and operating at an engine speed, the method comprising the steps of:

setting an operating condition for the engine, including a throttle condition, a loading condition and an engine speed;

measuring measured values for the turbo boost pressure, the engine speed and the engine load to determine the known turbo boost pressure, the known engine speed and the known engine load for the operating condition; and storing the known turbo boost pressure, the known engine speed and the known engine load as a data point in the data table to create a sparsely populated data table;

whereby an engine load value which estimates the load being experienced by the engine can be determined as a function of the known engine speed and the known turbo boost pressure.

18. The method of claim 17, further comprising the steps of approximating approximated values intermediate the measured values from at least two data points in the data table and storing the approximated values as a data point in the data table to create a more fully populated data table.

19. The method of claim 18, wherein the step of approximating approximated values comprises the step of performing a least squares regression for each unique set of four adjacent data points.

20. The method of claim 17, wherein the step of generating a data table further comprises the step of smoothing the data points of the more fully populated data table.

21. The method of claim 17, wherein the step of generating a data table further comprises the step of selecting data points from the fully populated data table at discrete engine speeds.

22. An electronic transmission controller for use in an off-road vehicle of the type having an engine including a turbo charger, a turbo boost pressure sensor and an engine speed sensor, and a powershift transmission system having at least one directional clutch which is proportionally modulatable in response to a shift profile signal for shifting the powershift transmission system, the electronic transmission controller comprising:

a turbo boost signal generator for generating a turbo boost signal from the turbo boost pressure sensor;

an engine speed signal generator for generating an engine speed signal from the engine speed sensor;

means for estimating the load being experienced by the engine as a function of the turbo boost signal and the engine speed signal and producing an engine load value; and a shift profile signal generator for generating a shift profile signal from the engine load value, whereby the shift profile signal proportionally modulates said at least on directional clutch for shifting the powershift transmission.

23. The electronic transmission controller of claim 22 further comprising a memory to store a data table representing a known engine load as a function of a known engine speed and a known turbo boost pressure for a plurality of operating conditions of the engine, whereby the engine load value is determined by comparing the turbo boost signal and the engine speed signal with the data table.

24. The electronic transmission controller of claim 23 wherein the electronic transmission controller is arranged to compute the engine load value from a linear interpolation of the data table, the turbo boost signal and the engine speed signal.

25. The electronic transmission controller of claim 22 further comprises a load signal generator for generating a percentage load from the engine load value, whereby a weighted shift profile signal is generated by the shift profile signal generator based on the percentage load, a no-load shift profile and a full-load shift profile.

26. A powershift transmission system for an off-road vehicle of the type having an engine including a turbo charger, a turbo boost pressure sensor and an engine speed sensor, the powershift transmission system comprising:

an electronic controller including a turbo boost signal generator for generating a turbo boost signal from the turbo boost pressure sensor, an engine speed signal generator for generating an engine speed signal from the engine speed sensor, an engine load value generator for generating an engine load value as a function of the turbo boost signal and the engine speed signal, and a shift profile signal generator for generating a shift profile signal from the engine load value; and at least one directional clutch having a modulatable valve for proportionally modulating the at least one directional clutch into engagement at a desired rate of engagement in response to the shift profile signal to shift the powershift transmission system.

27. The powershift transmission system of claim 26 wherein the electronic controller further comprises a memory to store a data table representing a known engine load as a function of a known engine speed and a known turbo boost pressure for a plurality of operating conditions of the engine, whereby the engine load value is determined by comparing the turbo boost signal and the engine speed signal with the data table.

28. The powershift transmission system of claim 27 wherein the electronic transmission controller is arranged to compute the engine load value from a linear interpolation of the data table, the turbo boost signal and the engine speed signal.

29. The powershift transmission system of claim 26 wherein the electronic transmission controller further comprises a load signal generator for generating a percentage load from the engine load value, whereby a weighted shift profile signal is generated by the shift profile signal generator based on the percentage load, a no-load shift profile and a full-load shift profile.

* * * * *

UNITED STATES PATENT AND TRADEMARK OFFICE
CERTIFICATE OF CORRECTION

PATENT NO.    : 5,778,329
DATED         : July 7, 1998
INVENTOR(S)   : Officer et al.

It is certified that error appears in the above-indentified patent and that said Letters Patent is hereby corrected as shown below:

Column 7, line 11, after "through" delete "of".

Column 7, line 38, replace "1 F" with --1F--.

Column 11, line 26, replace "rear" with --near--.

Column 13, line 16, after "disclosed" add --in--.

Column 13, line 57, after "has passed," add --as indicated at step 112. If not, this routine is--.

Column 16, line 20, delete line number "10".

Column 19, line 59, after "40" add --kPa--.

Column 19, line 60, after "40" add --kPa--.

Column 23, line 6, delete paragraph indent between "10F. Similarly,".

Column 29, line 2, replace "on" with --one--.

Signed and Sealed this

Twenty-eighth Day of September, 1999

*Attest:*

Q. TODD DICKINSON

*Attesting Officer*    *Acting Commissioner of Patents and Trademarks*